(12) United States Patent
Nakamura

(10) Patent No.: US 10,507,897 B2
(45) Date of Patent: *Dec. 17, 2019

(54) VESSEL PROPULSION APPARATUS

(71) Applicant: YAMAHA HATSUDOKI KABUSHIKI KAISHA, Iwata-shi, Shizuoka (JP)

(72) Inventor: Daisuke Nakamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,918

(22) Filed: Jun. 18, 2019

(65) Prior Publication Data

US 2019/0300136 A1    Oct. 3, 2019

Related U.S. Application Data

(63) Continuation-in-part of application No. 16/164,852, filed on Oct. 19, 2018, now Pat. No. 10,427,771, (Continued)

(30) Foreign Application Priority Data

Jun. 7, 2016  (JP) .................. 2016-113793

(51) Int. Cl.
*B63H 21/17*    (2006.01)
*B63H 20/00*    (2006.01)
(Continued)

(52) U.S. Cl.
CPC .............. *B63H 21/17* (2013.01); *B60K 6/20* (2013.01); *B63H 20/007* (2013.01); *B63H 20/20* (2013.01);
(Continued)

(58) Field of Classification Search
CPC ........ B63H 21/17; B63H 23/30; B63H 23/34; B63H 20/20; B63H 20/007; B60K 6/20
See application file for complete search history.

(56) References Cited

U.S. PATENT DOCUMENTS 3,148,557 A    9/1964  Shimanckas et al.
3,703,642 A *  11/1972  Balaguer .............. B63H 20/007
                                                  290/43
(Continued)

FOREIGN PATENT DOCUMENTS

JP    63-158493 U    10/1988
JP    2008-137646 A   6/2008
(Continued)

OTHER PUBLICATIONS

Nakamura, "Vessel Propulsion Apparatus", U.S. Appl. No. 16/164,852, filed Oct. 19, 2018.
(Continued)

*Primary Examiner* — Stephen P Avila
(74) *Attorney, Agent, or Firm* — Keating and Bennett, LLP

(57) ABSTRACT

A vessel propulsion apparatus includes an engine, an electric motor located farther forward than a propeller, a propeller shaft, a first transmission that defines a first transmission path extending from the engine to the propeller shaft to transmit power of the engine to the propeller shaft along the first transmission path, and a second transmission that defines a second transmission path, different from the first transmission path, extending from the electric motor to the propeller shaft to transmit power of the electric motor to the propeller shaft along the second transmission path.

20 Claims, 11 Drawing Sheets

Related U.S. Application Data which is a continuation of application No. 15/376,713, filed on Dec. 13, 2016, now Pat. No. 10,150,550.

(51) Int. Cl.
| | | |
|---|---|---|
| *B63H 23/30* | (2006.01) | |
| *B63H 23/34* | (2006.01) | |
| *B60K 6/20* | (2007.10) | |
| *B63H 20/20* | (2006.01) | |
| *B63H 21/20* | (2006.01) | |

(52) U.S. Cl.
CPC ............ *B63H 23/30* (2013.01); *B63H 23/34* (2013.01); *B63H 2021/205* (2013.01); *Y02T 70/5236* (2013.01)

(56) References Cited

U.S. PATENT DOCUMENTS

| | | | |
|---|---|---|---|
| 10,150,550 B2* | 12/2018 | Nakamura | ............ B63H 21/17 |
| 2008/0113569 A1 | 5/2008 | Kaji | |
| 2011/0195620 A1* | 8/2011 | Davis | .................... B63H 20/14 440/75 |
| 2012/0258639 A1 | 10/2012 | Rolla | |

FOREIGN PATENT DOCUMENTS

| | | |
|---|---|---|
| JP | 2013-519574 A | 5/2013 |
| JP | 2014-512302 A | 5/2014 |

OTHER PUBLICATIONS

Official Communication issued in Japanese Patent Application No. 2016-113793, dated Oct. 3, 2019.

\* cited by examiner

FIG. 8
During forward drive

| Control lever position | F3 | ↓ | ↑ | F2 | ↓ | ↑ | F1 | ↓ | ↑ | N |
|---|---|---|---|---|---|---|---|---|---|---|
| Engine | ON | ↓ | ↑ | ON | START ↓ | STOP ↑ | OFF | ↓ | ↑ | OFF |
| Electric motor | OFF | ↓ | ↑ | OFF | Synchronous ↓ | Synchronous ↑ | Forward rotation | ↓ | ↑ | OFF |
| | | | | | | | Forward rotation | | | |
| First dog clutch | F | ↓ | ↑ | F | N→F ↓ | F→N ↑ | N | ↓ | ↑ | N |
| Second dog clutch | OFF | ↓ | ↑ | OFF | ON→OFF ↓ | OFF→ON ↑ | ON | ↓ | ↑ | ON |
| Vessel operating mode | EG forward drive | ↓ | ↑ | EG forward drive | EG starting & HV switching during EM forward drive ↓ | HV switching & EG stopping during EG forward drive ↑ | EM forward drive | ↓ | ↑ | Vessel stop |
| | | | | | | | EM forward drive | | | Vessel stop |

FIG. 9
During reverse drive

| Control lever position | N | → | R1 | → | R2 | → | R3 |
|---|---|---|---|---|---|---|---|
| Engine | OFF | ↑ | OFF | ↑ | START | ↑ | ON |
|  | OFF | ↓ | OFF | ↓ | STOP | ↓ | ON |
| Electric motor | OFF | ↑ | Reverse rotation | ↑ | Reverse rotation | ↑ | OFF |
|  | OFF | ↓ | Reverse rotation | ↓ | Synchronous | ↓ | OFF |
| First dog clutch | N | ↑ | N | ↑ | N→R | ↑ | R |
|  | N | ↓ | N | ↓ | R→N | ↓ | R |
| Second dog clutch | ON | ↑ | ON | ↑ | ON→OFF | ↑ | OFF |
|  | ON | ↓ | ON | ↓ | OFF→ON | ↓ | OFF |
| Vessel operating mode | Vessel stop | ↑ | EM reverse drive | ↑ | EG starting & HV switching during EM reverse drive | ↑ | EG reverse drive |
|  | Vessel stop | ↓ | EM reverse drive | ↓ | HV switching & EG stopping during EG reverse drive | ↓ | EG reverse drive |

FIG. 13
During forward drive

| Control lever position | F3 | F2 | F1 | N |
|---|---|---|---|---|
| Engine | ↓ ON ↑ | ↓ Low speed ↑ | ↓ Low speed ↑ | ↓ Idling speed ↑ |
| | ↓ ON ↑ | ↓ Low speed ↑ | ↓ Low speed ↑ | ↓ Idling speed ↑ |
| Hydraulic motor | ↓ Forward rotation ↑ | ↓ Synchronous ↑ | ↓ Forward rotation ↑ | ↓ OFF ↑ |
| | ↓ Forward rotation ↑ | ↓ Synchronous ↑ | ↓ Forward rotation ↑ | ↓ OFF ↑ |
| First dog clutch | ↓ F ↑ | ↓ N→F ↑ | ↓ N ↑ | ↓ N ↑ |
| | ↓ F ↑ | ↓ F→N ↑ | ↓ N ↑ | ↓ N ↑ |
| Second dog clutch | ↓ OFF ↑ | ↓ ON→OFF ↑ | ↓ ON ↑ | ↓ ON ↑ |
| | ↓ OFF ↑ | ↓ OFF→ON ↑ | ↓ ON ↑ | ↓ ON ↑ |
| Vessel operating mode | ↓ EG forward drive ↑ | ↓ HV switching during HM forward drive ↑ | ↓ HM forward drive ↑ | ↓ Vessel stop ↑ |
| | ↓ EG forward drive ↑ | ↓ HV switching during EG forward drive ↑ | ↓ HM forward drive ↑ | ↓ Vessel stop ↑ |

VESSEL PROPULSION APPARATUS

BACKGROUND OF THE INVENTION

1. Field of the Invention

The present invention relates to a vessel propulsion apparatus.

2. Description of the Related Art

JP 2007-008329 A discloses a hybrid type outboard motor including an internal combustion engine (hereinafter referred to as "engine") and an electric motor. US 2008/113569 A1 also discloses a hybrid type outboard motor.

The outboard motor of JP 2007-008329 A includes a drive force adjusting unit including an automatic centrifugal clutch and a differential gear. The rotation of the engine is transmitted to the drive force adjusting unit and then transmitted to a propeller via a drive shaft and a propeller shaft. Similarly, the rotation of the electric motor is transmitted to the drive force adjusting unit and then transmitted to the propeller via the drive shaft and the propeller shaft. When moving the vessel forward at low speed, only the electric motor is used to drive the propeller. When moving the vessel forward at a predetermined speed or higher, the rotation speed of the engine is increased to close the automatic centrifugal clutch. This causes both the engine and the electric motor to drive the propeller.

The outboard motor of US 2008/113569 A1 includes a multi-disk clutch interposed between an engine and an electric motor that are located in series. The rotation of the engine is transmitted to a drive shaft via the multi-disk clutch and the electric motor and then transmitted to a propeller via a propeller shaft. The rotation of the electric motor is transmitted to the propeller not via the engine and the multi-disk clutch but via the drive shaft and the propeller shaft. When moving the vessel forward at low speed, the multi-disk clutch is opened and only the electric motor is used to drive the propeller. When moving the vessel forward at a predetermined speed or higher, the multi-disk clutch is closed and only the engine or both the engine and the electric motor are used to drive the propeller.

However, in both JP 2007-008329 A and US 2008/113569 A1, the power of the electric motor is transmitted to the propeller shaft through the transmission path for the engine through which the power of the engine is transmitted to the propeller shaft. This requires an additional part or component such as the drive force adjusting unit or the multi-disk clutch, etc., to be located in the transmission path for the engine. It is therefore necessary to considerably modify a transmission provided in existing vessel propulsion apparatuses (non-hybrid type vessel propulsion apparatuses) including only an engine and to provide many dedicated parts or components including drive shafts for hybrid type outboard motors.

SUMMARY OF THE INVENTION

In order to overcome the previously unrecognized and unsolved challenges described above, preferred embodiments of the present invention provide a vessel propulsion apparatus including an engine, an electric motor located farther forward than a propeller, a propeller shaft that rotates together with the propeller about a rotation axis extending in a front-rear direction, a first transmission that defines a first transmission path extending from the engine to the propeller shaft to transmit power of the engine to the propeller shaft along the first transmission path, and a second transmission that defines a second transmission path, different from the first transmission path, extending from the electric motor to the propeller shaft to transmit power of the electric motor to the propeller shaft along the second transmission path.

In accordance with the structure described above, the power of the engine is transmitted to the propeller shaft by the first transmission (for example, a first transmission member) defining the first transmission path. The power of the electric motor is transmitted to the propeller shaft by the second transmission (for example, a second transmission member) defining the second transmission path. The first transmission path extends from the engine to the propeller shaft, while the second transmission path extends from the electric motor to the propeller shaft not via the first transmission path. That is, the first transmission path and the second transmission path are mutually independent parallel paths. It is therefore possible to divert a first transmission provided in existing vessel propulsion apparatuses including only an engine. Further, the second transmission, which does not transmit the power of the engine, is significantly improved or optimized such that the power of the electric motor is transmitted efficiently.

In the present preferred embodiment, at least one of the following features may be added to the above vessel propulsion apparatus.

The vessel propulsion apparatus further includes a lower case that houses the propeller shaft therein, in which the electric motor is located at least partially within the lower case.

In accordance with the structure described above, the electric motor is located entirely or partially within the lower case that houses the propeller shaft therein. The second transmission extending from the electric motor to the propeller shaft is also located within the lower case. Thus, existing vessel propulsion apparatuses are modified into hybrid type vessel propulsion apparatuses only by modifying the lower unit including the lower case and members held thereon. In other words, the structure in a region higher than that of the lower case is at least partially similar or the same as existing vessel propulsion apparatuses. Further, the electric motor, which is housed in the lower case to be submerged in water, is cooled effectively via the lower case.

The vessel propulsion apparatus further includes a water pump that pumps water outside the vessel propulsion apparatus into the vessel propulsion apparatus, in which the electric motor is located at least partially at a position lower than that of the water pump.

In accordance with the structure described above, the electric motor is located entirely or partially at a position lower than that of the water pump that pumps water outside the vessel propulsion apparatus into the vessel propulsion apparatus. The second transmission extending from the electric motor to the propeller shaft is also located at a position lower than that of the water pump. Thus, the structure in a region higher than that of the water pump is at least partially similar or the same as existing vessel propulsion apparatuses. This reduces costs for the development of hybrid type vessel propulsion apparatuses.

The vessel propulsion apparatus further includes a lower case that houses the propeller shaft therein, in which the first transmission includes the drive shaft inserted in the lower case, and the electric motor is located farther forward than the drive shaft.

In conventional outboard motors, the drive shaft to be driven and rotated by the engine is located in front of the exhaust channel through which exhaust gas of the engine is discharged. In accordance with the structure described above, the electric motor is located farther forward than the drive shaft. Accordingly, the electric motor is located farther forward than the exhaust channel. The electric motor is thus provided without affecting the exhaust channel.

The first transmission includes a forward-reverse switch that switches the direction of rotation transmitted to the propeller shaft according to power transmitted from a shift actuator, and the electric motor is located farther rearward than the shift actuator.

In accordance with the structure described above, the power of the shift actuator is transmitted to the forward-reverse switch and the direction of rotation transmitted from the engine to the propeller shaft is switched. The electric motor is located farther rearward than the shift actuator. Accordingly, the electric motor is closer to the propeller shaft, compared to the case in which the electric motor is located farther forward than the shift actuator, so that the second transmission path is shortened. This reduces power loss through the second transmission path and thus power transmission efficiency increases.

The electric motor includes an output shaft extending in a vertical direction. Alternatively, the electric motor includes an output shaft extending in a front-rear direction. In the latter case, the output shaft may be coaxial with the propeller shaft.

Typically, the electric motor is longer in the axial direction than in the radial direction. The output shaft of the electric motor extends in the axial direction of the electric motor. When the output shaft of the electric motor extends vertically and the axial direction of the electric motor is parallel or substantially parallel to the vertical direction, the vessel propulsion apparatus has a smaller size in the front-rear direction, compared to the case in which the output shaft of the electric motor extends in the front-rear direction. On the other hand, when the output shaft of the electric motor extends in the front-rear direction and the axial direction of the electric motor is parallel or substantially parallel to the front-rear direction, the vessel propulsion apparatus has a smaller vertical size, compared to the case in which the output shaft of the electric motor extends vertically.

The first transmission includes a first clutch that switches between a disconnecting state in which the first transmission path is disconnected and a connecting state in which the disconnecting state of the first transmission path is terminated, and the second transmission includes a second clutch that switches between a disconnecting state in which the second transmission path is disconnected and a connecting state in which the disconnecting state of the second transmission path is terminated.

The second clutch may be a positive clutch such as a dog clutch, etc., or may be a friction clutch, or a clutch of a type other than these. For example, the second clutch may be a reverse input shutoff clutch that transmits torque in the forward rotation direction and the reverse rotation direction to the propeller shaft and that cuts off torque transmission from the propeller shaft to the electric motor.

In accordance with the structure described above, the first clutch that connects and disconnects the first transmission path is located in the first transmission path and the second clutch that connects and disconnects the second transmission path is located in the second transmission path. Resistance of the electric motor is prevented from being transmitted to the propeller shaft by disconnecting the second clutch when the engine rotates the propeller shaft. Further, a large induced electromotive force is prevented from occurring in the electric motor by disconnecting the second clutch even if the engine rotates the propeller shaft at high speed. In addition, it is possible to prevent a large induced electromotive force from occurring in the electric motor while causing the electric motor to function as a generator by switching the second clutch between the disconnecting state and the connecting state when the engine rotates the propeller shaft.

The vessel propulsion apparatus further includes an interlocking device that interlocks the first clutch and the second clutch.

The interlocking device may include a connector that connects the first clutch and the second clutch to each other and an actuator that switches the first clutch and the second clutch by moving the connector. Alternatively, the interlocking device may include a first actuator that switches the first clutch and a second actuator that switches the second clutch independently of the first clutch.

The interlocking device switches the second clutch from the disconnecting state to the connecting state while switching the first clutch from the connecting state to the disconnecting state and the interlocking device switches the first clutch from the disconnecting state to the connecting state while switching the second clutch from the connecting state to the disconnecting state.

In accordance with the structure described above, when the first clutch is switched to the disconnecting state, the second clutch is switched to the connecting state. In contrast, when the second clutch is switched to the disconnecting state, the first clutch is switched to the connecting state. It is therefore possible to prevent the resistance of the electric motor from being transmitted to the propeller shaft when the engine rotates the propeller shaft. Alternatively, it is possible to prevent the resistance of the engine from being transmitted to the propeller shaft when the electric motor rotates the propeller shaft. This allows the power of the engine and the electric motor to be utilized efficiently.

The first clutch includes a first movable member movable between a disconnection position in which the first transmission path is disconnected and a connection position in which the disconnection of the first transmission path is terminated, and the second clutch includes a second movable member movable between a disconnection position in which the second transmission path is disconnected and a connection position in which the disconnection of the second transmission path is terminated, and in which the interlocking device includes a shift slider that moves together with the first movable member and the second movable member and a shift actuator that generates power to move the shift slider.

In accordance with the structure described above, when the shift actuator moves the shift slider, the first movable member moves between the disconnection position and the connection position and the second movable member moves between the disconnection position and the connection position. This interlocks the first clutch and the second clutch. Further, since such a single shift actuator moves both the first movable member and the second movable member, the vessel propulsion apparatus has a smaller size, compared to the case in which actuators are provided, respectively, for the first movable member and the second movable member.

The first transmission includes a first drive gear that rotates according to the rotation of the engine, a first driven gear that is driven and rotated by the first drive gear, and a first dog clutch movable between a connection position in which the first dog clutch rotates together with the first driven gear and a disconnection position in which the first dog clutch is separated from the first driven gear and that rotates together with the propeller shaft about the rotation axis, the vessel propulsion apparatus further includes a shift actuator that moves the first dog clutch between the connection position and the disconnection position and a controller configured or programmed to cause the shift actuator to move the first dog clutch between the connection position and the disconnection position when the difference between the rotation speed of the first driven gear and the rotation speed of the first dog clutch is greater than a lower limit and equal to or lower than an upper limit. The controller includes a processor such as a CPU (Central Processing Unit) and a storage in which various data including programs are stored.

In accordance with the structure described above, before the first dog clutch engages with the first driven gear, the controller is configured or programmed to control the rotation speeds of the engine and the electric motor such that the first driven gear and the first dog clutch have almost the same but mutually different rotation speeds. In a case in which the rotation speed of the first dog clutch is equal to the rotation speed of the first driven gear, it may be difficult for the first dog clutch to engage with the first driven gear. Thus, controlling the rotation speed of the first driven gear and the first dog clutch allows the first dog clutch to reliably engage with the first driven gear while preventing the generation of noise.

The first transmission includes a first drive gear that rotates according to the rotation of the engine, a first driven gear that is driven and rotated by the first drive gear, and a first dog clutch that moves between a connection position to rotate together with the first driven gear and a disconnection position separated from the first driven gear to rotate together with the propeller shaft about the rotation axis, and the second transmission includes a shift slider that rotates together with the propeller shaft about the rotation axis and moves together with the first dog clutch in a front-rear direction with respect to the propeller shaft.

In accordance with the structure described above, the rotation of the electric motor is transmitted to the shift slider that moves together with the first dog clutch in a front-rear direction. This causes the shift slider to rotate together with the propeller shaft and the rotation of the electric motor to be transmitted to the propeller. Since the shift slider, which is included in existing vessel propulsion apparatuses and thus doubles as a component of the second transmission, the number of components of the vessel propulsion apparatus is reduced and the vessel propulsion apparatus has a smaller size.

The second transmission includes a reduction mechanism that transmits power of the electric motor to the propeller shaft while amplifying the power.

In accordance with the structure described above, the rotation of the electric motor is transmitted to the reduction mechanism. The reduction mechanism transmits the rotation of the electric motor to the propeller shaft while reducing the number of rotations. Meanwhile, the power (torque) of the electric motor is amplified. It is therefore possible to increase the maximum value of the torque transmitted from the electric motor to the propeller shaft. Alternatively, it is possible to reduce the size of the electric motor while maintaining the maximum value of the torque transmitted from the electric motor to the propeller shaft.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a table showing the relationship between the position of a control lever and the operation of an engine and other components when the control lever is tilted forward.

FIG. 9 is a table showing the relationship between the position of the control lever and the operation of the engine and other components when the control lever is tilted rearward.

FIG. 13 is a table showing the relationship between the position of a control lever and the operation of an engine and other components when the control lever is tilted forward.

DETAILED DESCRIPTION OF THE PREFERRED EMBODIMENTS

Figure 1:
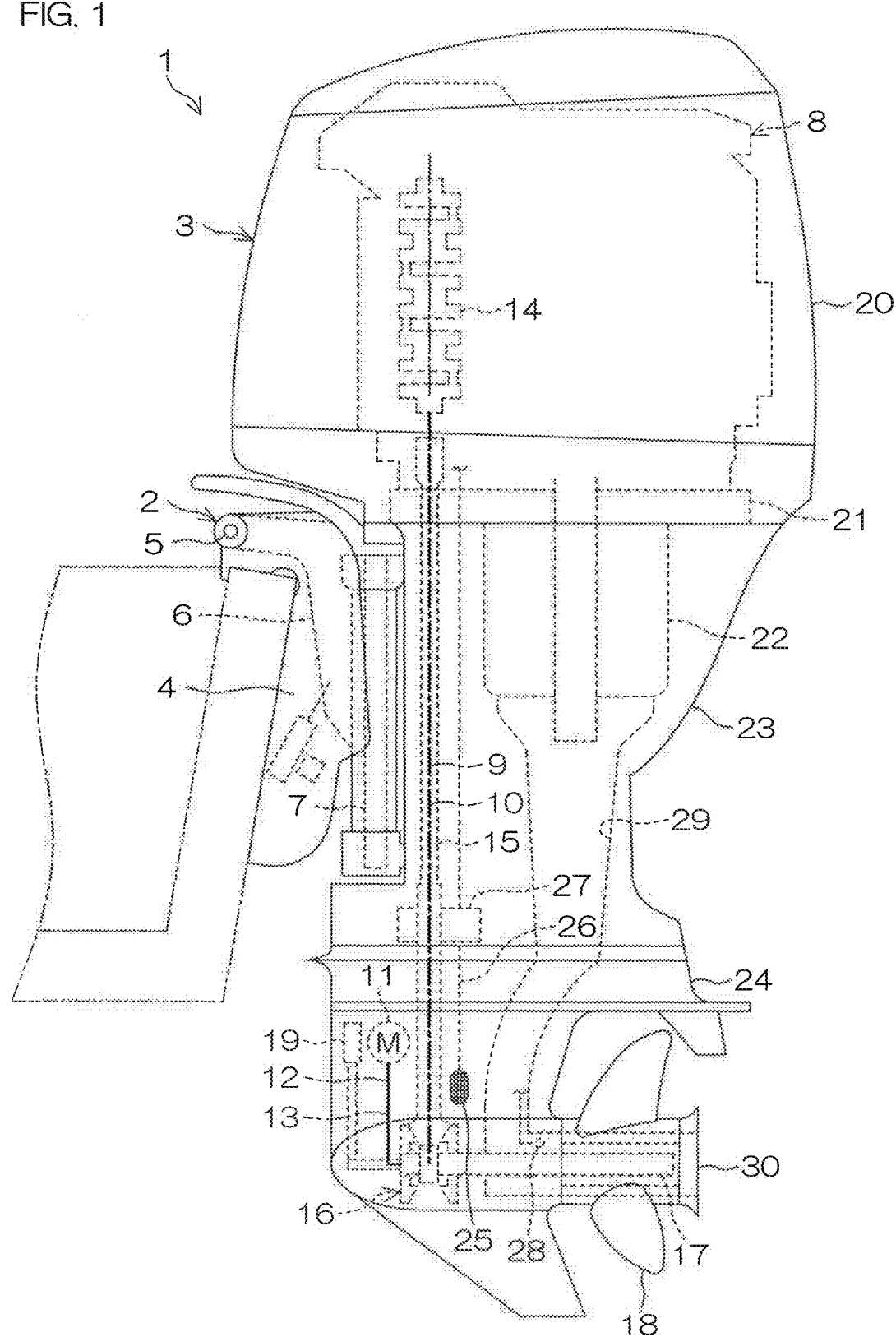
FIG. 1 is a schematic left side view showing a vessel propulsion apparatus according to a first preferred embodiment of the present invention.
Figure 2:
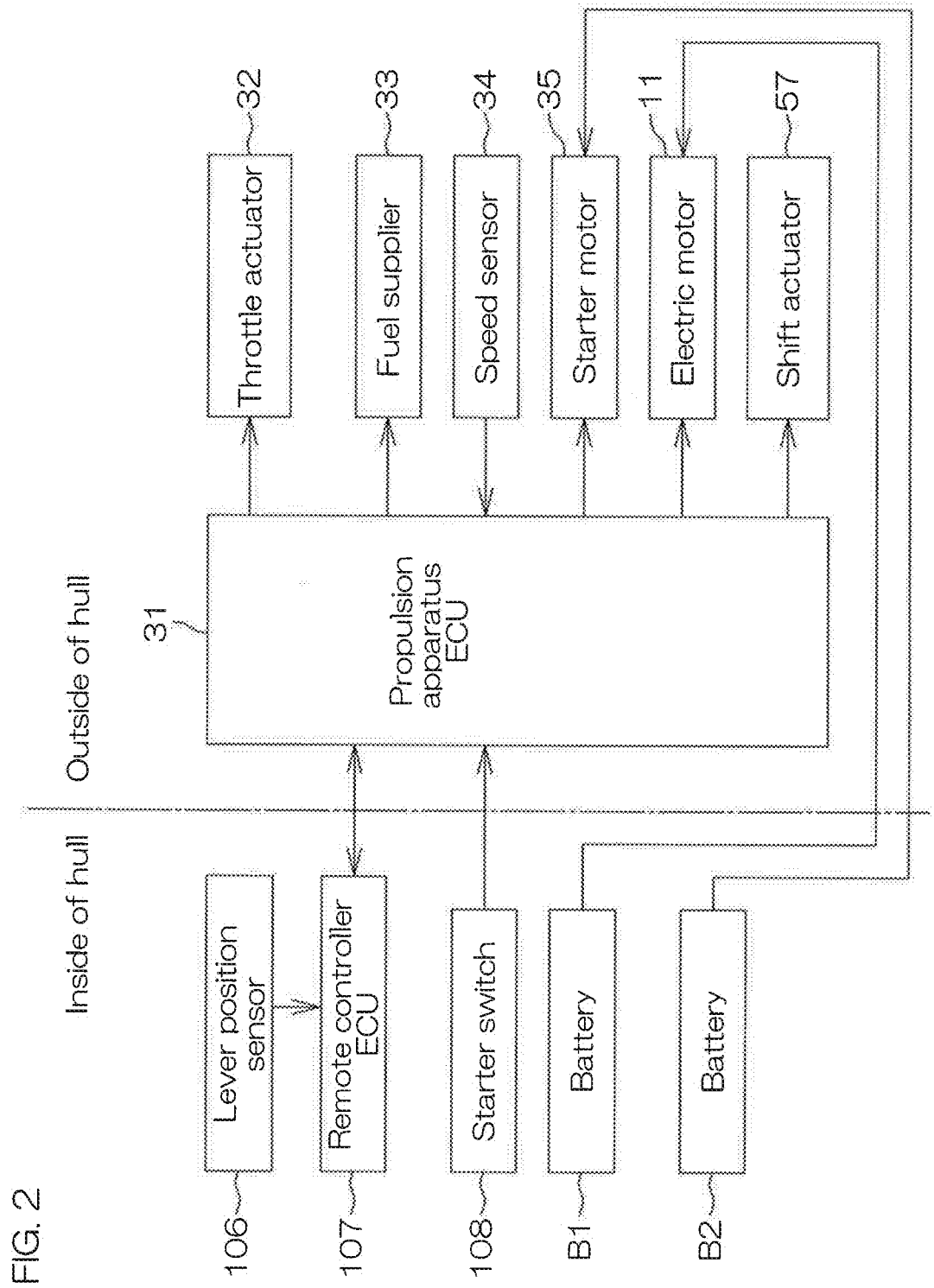
FIG. 2 is a block diagram showing an electrical arrangement of the vessel propulsion apparatus.

FIG. 1 is a schematic left side view showing a vessel propulsion apparatus 1 according to a first preferred embodiment of the present invention. FIG. 2 is a block diagram showing an electrical arrangement of the vessel propulsion apparatus 1.

In the following description, a vessel propulsion apparatus 1 in a reference posture is described. In the reference posture, a rotation axis of the engine 10 (a rotation axis of a crankshaft) extends in the vertical direction, and a rotation axis of a propeller shaft 17 perpendicular or substantially perpendicular to the rotation axis of the engine 10 extends in the front-rear direction.

As shown in FIG. 1, a vessel includes a hull H1 that floats on a water surface and the vessel propulsion apparatus 1 that generates a thrust to propel the hull H1. The vessel propulsion apparatus 1 includes an outboard motor 2 that generates a thrust and a suspension device that mounts the outboard motor 2 to a rear portion of the hull H1. The vessel propulsion apparatus 1 further includes a steering device that turns the outboard motor 2 in the left/right direction with respect to the hull H1 and a tilting device that turns the outboard motor 2 in the up/down direction with respect to the hull H1.

The suspension device 2 includes a clamp bracket 7 that is attachable to the stern, a swivel bracket 6 supported by the clamp bracket 7, and a steering shaft 7 supported by the swivel bracket 6. The swivel bracket 6 is rotatable about a tilt shaft 5 extending in the left-right direction with respect to the clamp bracket 7. The steering shaft 7 is rotatable about the steering shaft 7 extending in the up/down direction with respect to the swivel bracket 6.

The outboard motor 3 is located at the rear of the hull H1. The outboard motor 3 is coupled to an upper end portion and a lower end portion of the steering shaft 7, respectively, via an upper mount and a lower mount. The outboard motor 3 rotates together with the steering shaft 7 about the steering shaft 7. The outboard motor 3 is rotatable about the steering shaft 7 with respect to the hull H1 and rotatable about the tilt shaft 5 with respect to the hull H1.

The outboard motor 3 includes a first powertrain including an engine 8 and a second powertrain including an electric motor 11. Both of the engine 8 and the electric motor 11 are examples of a prime mover that generates power to rotate a propeller 18. The rotation of the engine 8 is transmitted to the propeller 18 via the propeller shaft 17. Similarly, the rotation of the electric motor 11 is transmitted to the propeller 18 via the propeller shaft 17. That is, the propeller shaft 17 is shared by the first and second powertrains.

In addition to the engine 8 and the propeller shaft 17, the first powertrain includes a first transmission 10 defining a first transmission path 9 that extends from the engine 8 to the propeller shaft 17. In addition to the electric motor 11 and the propeller shaft 17, the second powertrain includes a second transmission 13 defining a second transmission path 12 that extends from the electric motor 11 to the propeller shaft 17.

The first transmission path 9 and the second transmission path 12 are mutually independent parallel paths. The upstream end of the first transmission path 9 is connected to the engine 8, while the downstream end of the first transmission path 9 is connected to the propeller shaft 17 within the outboard motor 3. The upstream end of the second transmission path 12 is connected to the electric motor 11, while the downstream end of the second transmission path 12 is connected to the propeller shaft 17 within the outboard motor 3. The first transmission path 9 and the second transmission path 12 are separate from each other from the engine 8 and the electric motor 11 to the propeller shaft 17.

The outboard motor 3 includes a casing that houses the first and second powertrains. The casing includes an engine cowl 20 that houses the engine 8, an exhaust guide 21 located beneath the engine 8, an upper case 23 located beneath the exhaust guide 21, and a lower case 24 located beneath the upper case 23. The engine 8 is located on the exhaust guide 21. The electric motor 11 is located within the lower case 24. An oil pan 22 storing lubricant oil is located between the exhaust guide 21 and the lower case 24, and housed in the upper case 23.

The first transmission 10 includes a drive shaft 15 extending in a vertical direction underneath the engine 8 and a forward-reverse switch 16 coupled to a lower end portion of the drive shaft 15. The drive shaft 15 is located within the upper case 23 and the lower case 24. The forward-reverse switch 16 and the propeller shaft 17 are located within the lower case 24. The propeller shaft 17 extends in the front-rear direction within the lower case 24. The propeller 18 is mounted to a rear end portion of the propeller shaft 17 that is located behind the lower case 24. The propeller 18 rotates together with the propeller shaft 17 in the forward rotation direction or in the reverse rotation direction.

The engine 8 rotates the drive shaft 15 in a predetermined rotation direction. The forward-reverse switch 16 switches among a forward drive state in which the rotation in the forward rotation direction is transmitted from the drive shaft 15 to the propeller shaft 17, a reverse drive state in which the rotation in the reverse rotation direction is transmitted from the drive shaft 15 to the propeller shaft 17, and a neutral state in which the transmission of rotation from the drive shaft 15 to the propeller shaft 17 is cut off. A shift device 19 of the outboard motor 3 switches the state of the forward-reverse switch 16 to switch the direction of rotation transmitted from the engine 8 to the propeller 18.

As shown in FIG. 2, the engine 8 includes a throttle actuator 32 that changes the opening degree of a throttle valve that changes the flow rate of air to be supplied to a combustion chamber and a fuel supplier 33 that changes the flow rate of fuel to be supplied to the combustion chamber. A propulsion apparatus ECU 31 (Electronic Controller), that is configured or programmed to control the vessel propulsion apparatus 1, controls the throttle actuator 32 and the fuel supplier 33 to change the output of the engine 8. The rotation speed of the engine 8 is detected by a speed sensor 34. The propulsion apparatus ECU 31 causes a starter motor 35 located within the cowl 20 to start the engine 8.

As shown in FIG. 1, the engine 8 is cooled by cooling water pumped from a water pump 27 in accordance with the rotation of the drive shaft 15. Water outside the outboard motor 3 is sucked into the outboard motor 3 through a water inlet 25 that is open in the outer surface of the lower case 24 and guided through a cooling water channel 26 to a water outlet 28. The cooling water channel 26 includes a water jacket provided in an engine main body including a cylinder head and a cylinder body, a water feed channel extending from the water inlet 25 to the water jacket, and a water drainage channel extending from the water jacket to the water outlet 28. The water outlet 28 is located within an exhaust channel 29 that guides, from the combustion chamber to the propeller 18, exhaust gas to be discharged through an exhaust outlet 30 of the propeller 18 into the water.

Figure 3:
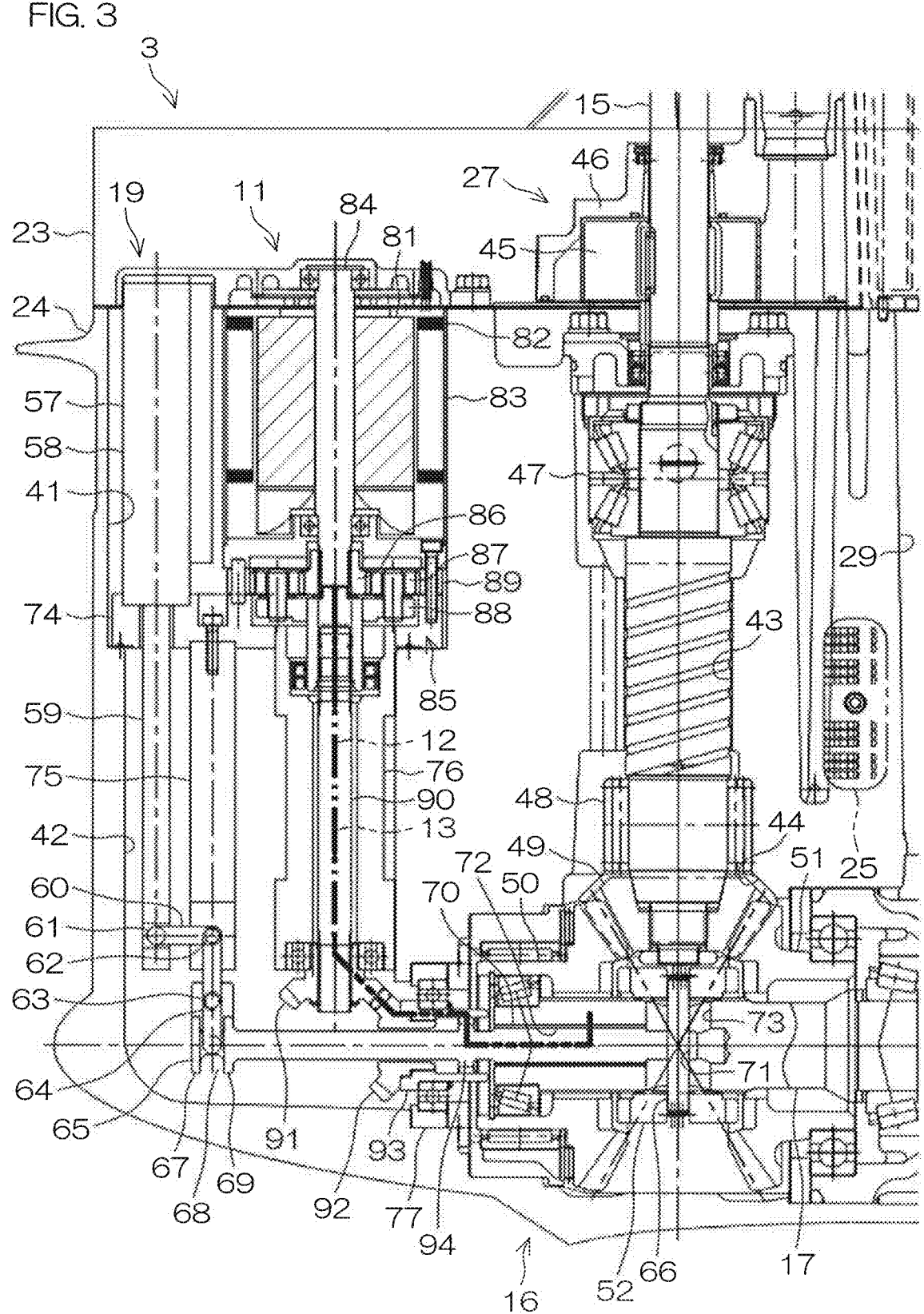
FIG. 3 is a sectional view showing a portion of a vertical section of a lower unit of an outboard motor.
Figure 4:
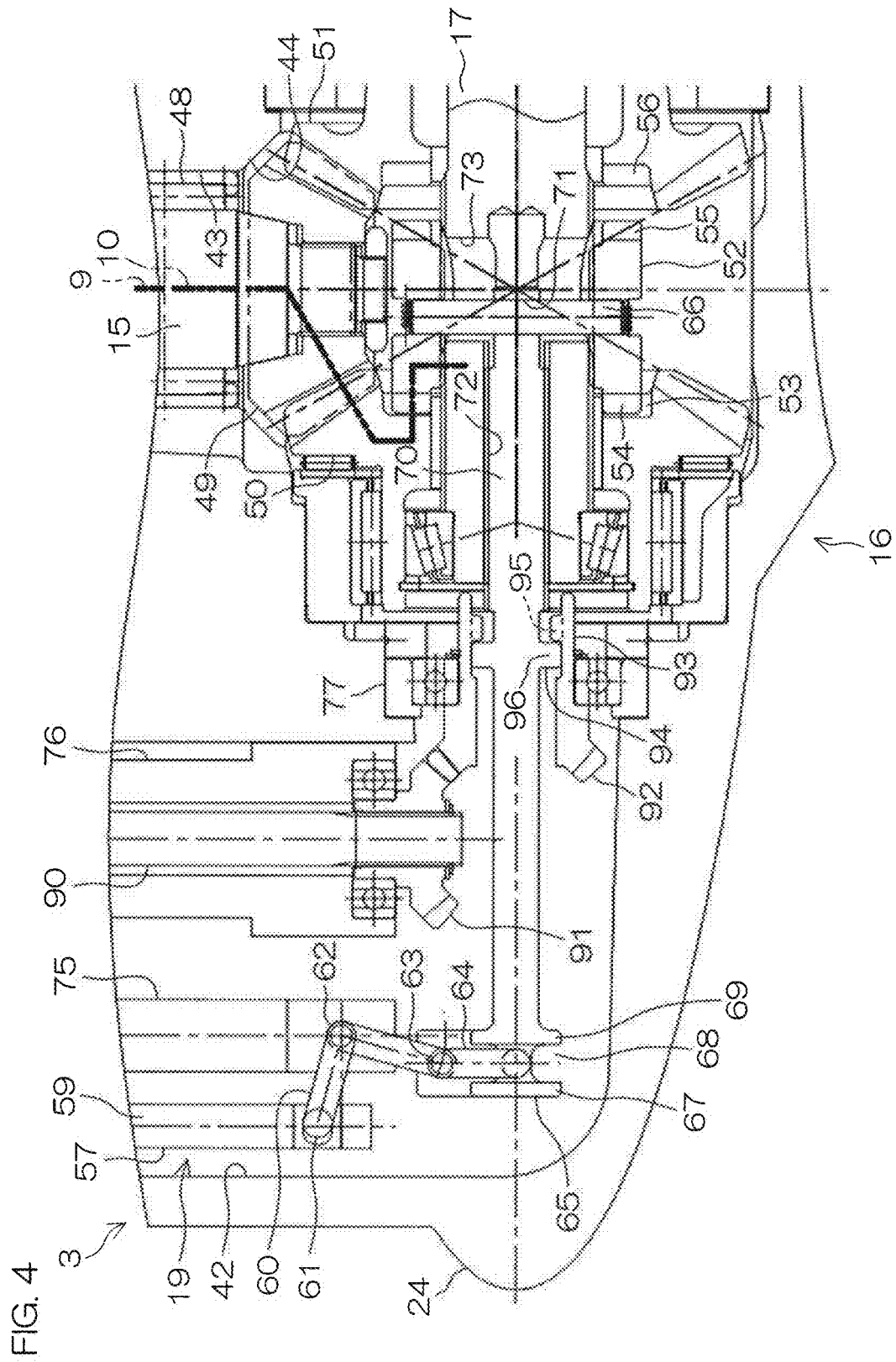
FIG. 4 is a sectional view showing a portion of a vertical section of the lower unit of the outboard motor.
Figure 5:
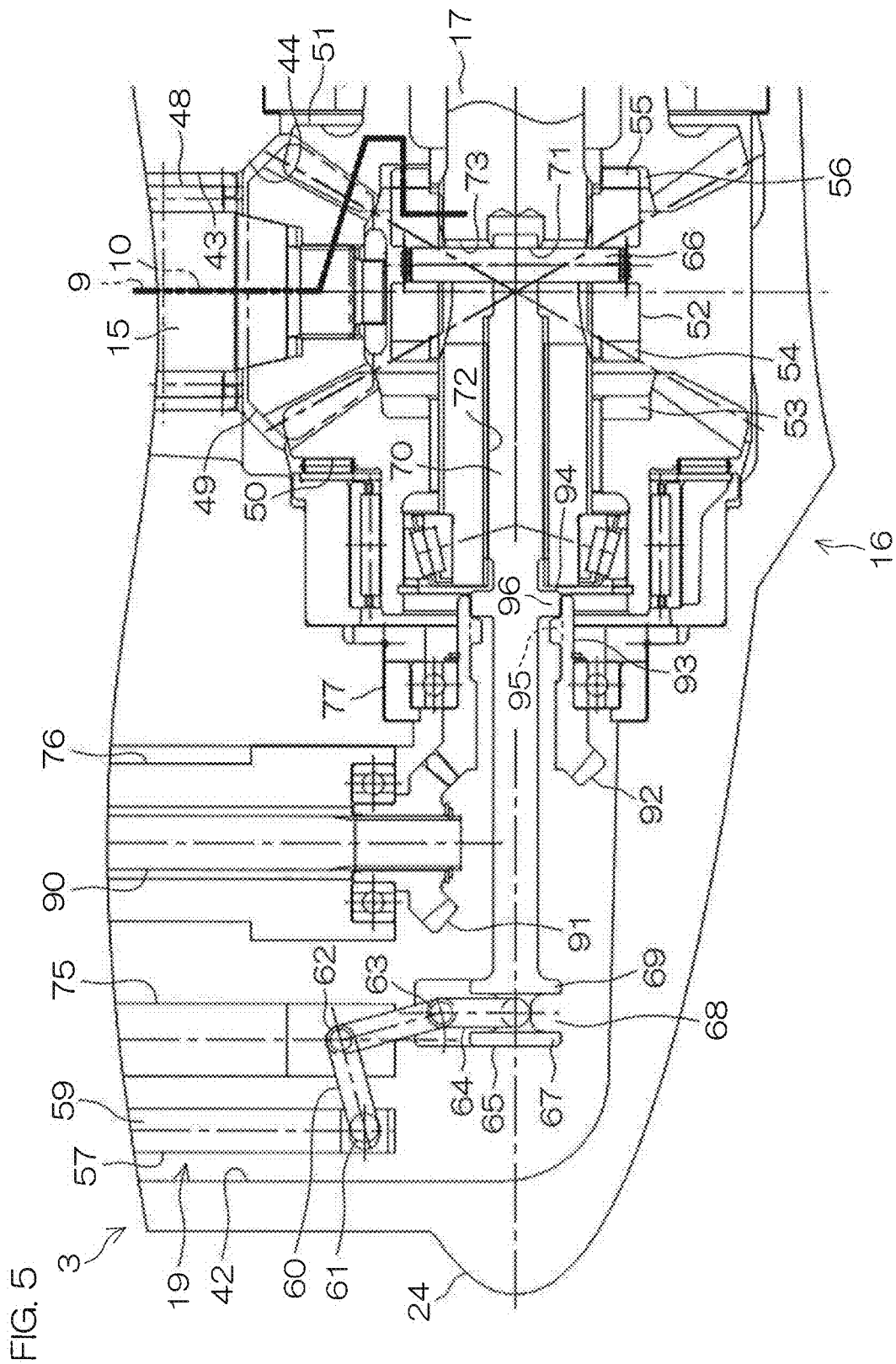
FIG. 5 is a sectional view showing a portion of a vertical section of the lower unit of the outboard motor.

FIGS. 3, 4, and 5 are sectional views showing a portion of a vertical section of the lower unit of an outboard motor 3. FIG. 3 shows a state in which a first dog clutch 52 is located in a neutral position and a second dog clutch 94 is located in a connection position. FIG. 4 shows a state in which the first dog clutch 52 is located in a forward drive position and the second dog clutch 94 is located in a front disconnection position. FIG. 5 shows a state in which the first dog clutch 52 is located in a reverse drive position and the second dog clutch 94 is located in a rear disconnection position.

As shown in FIG. 3, the lower case 24 defines a first housing chamber that houses the first powertrain and a second housing chamber that houses the second powertrain. The first housing chamber includes a shaft insertion hole 43 into which the drive shaft 15 is inserted and a gear chamber 44 in which the forward-reverse switch 16 is provided. The second housing chamber includes a motor chamber 41 in which the electric motor 11 is located and a shift chamber 42 in which a front end portion of a shift slider 65 to be described hereinafter is located.

The shaft insertion hole 43 extends upward from the gear chamber 44 and the motor chamber 41 extends upward from the shift chamber 42. The shaft insertion hole 43 and the motor chamber 41 are separate from each other in the front-rear direction and the gear chamber 44 and the shift chamber 42 are connected to each other. The shift chamber 42 is separated from the motor chamber 41 by a spacer 74. The lubricant is reserved in the shaft insertion hole 43, the gear chamber 44, and the shift chamber 42.

The forward-reverse switch 16 includes a pinion 49 that rotates together with the drive shaft 15, a front gear 50 to be driven and rotated by the pinion 49, a rear gear 51 to be driven and rotated by the pinion 49 in the direction opposite to that of the front gear 50, and the first dog clutch 52 that moves between a connection position in which it engages with one of the front gear 50 and the rear gear 51 and a disconnection position in which it is separated from both the front gear 50 and the rear gear 51. The pinion 49 is an example of a first drive gear and the front gear 50 and the rear gear 51 are examples of a first driven gear.

Each of the pinion 49, the front gear 50, and the rear gear 51 is a bevel gear. The pinion 49 is coaxial with the drive shaft 15 and the front gear 50 and the rear gear 51 are coaxial with the propeller shaft 17. The front gear 50 and the rear gear 51 surround the propeller shaft 17 and are supported rotatably in the lower case 24. The front gear 50 and the rear gear 51 face each other across a space in the front-rear direction.

The first dog clutch 52 is located between the front gear 50 and the rear gear 51. The first dog clutch 52 is located beneath the pinion 49. The first dog clutch 52 has a cylindrical shape that surrounds the propeller shaft 17. The first dog clutch 52 is coupled to the propeller shaft 17 using splines extending in the front-rear direction. The first dog clutch 52 is movable in the front-rear direction with respect to the propeller shaft 17 and rotatable together with the propeller shaft 17.

As shown in FIGS. 4 and 5, the first dog clutch 52 includes a plurality of front convex portions 54 engaging, respectively, with a plurality of front recessed portions 53 of the front gear 50 and a plurality of rear convex portions 55 engaging, respectively, with a plurality of rear recessed portions 56 of the rear gear 51. The plurality of front convex portions 54 are located at equal or substantially equal intervals in the circumferential direction of the first dog clutch 52 and extend in the front-rear direction, which corresponds to the axial direction of the propeller shaft 17 and the first dog clutch 52. The plurality of rear convex portions 55 are also arranged similarly to the plurality of front convex portions 54. The first dog clutch 52, the front recessed portions 53, and the rear recessed portions 56 are included in a first clutch that connects and disconnects the first transmission path 9.

The first dog clutch 52 is located at one of the forward drive position (shown in FIG. 4), the neutral position (shown in FIG. 3), and the reverse drive position (shown in FIG. 5). In the forward drive position, the first dog clutch 52 engages and rotates together with the front gear 50. In the reverse drive position, the first dog clutch 52 engages and rotates together with the rear gear 51. In the neutral position, the transmission of rotation from the drive shaft 15 to the propeller shaft 17 is cut off. The neutral position is a disconnection position in which the first transmission path 9 is disconnected and the forward drive position and the reverse drive position are connection positions in which the disconnection of the first transmission path 9 is terminated (i.e., the first transmission path 9 is connected).

As shown in FIG. 3, the shift device 19 includes a shift actuator 57 that generates power to switch the state of the forward-reverse switch 16, the shift slider 65 that moves together with the first dog clutch 52 in the front-rear direction, a pusher 64 that pushes the shift slider 65 in the front-rear direction, a link arm 60 that transmits power of the shift actuator 57 to the pusher 64 and having an L shape in a side view, and a coupling pin 66 that couples the first dog clutch 52 and the shift slider 65 with each other. The shift device 19 is an example of an interlocking device.

The shift actuator 57 is located at least partially within the lower case 24. The shift actuator 57 includes a shift rod 59 movable in the axial direction, a shift motor that generates power to move the shift rod 59 in its axial direction, a ball screw and a ball nut that convert the rotation of the shift motor into a linear motion of the shift rod 59, and a shift housing 58 that houses the shift motor, the ball nut, and the ball screw therein.

The shift housing 58 is fixed to the lower case 24 via the spacer 74. The shift rod 59 protrudes downward from the shift housing 58. The vertically extending shift rod 59 is parallel or substantially parallel to the drive shaft 15. When the shift motor rotates its output shaft, the ball nut and the ball screw rotate relatively and the shift rod 59 moves in its axial direction with respect to the shift housing 58. This varies the amount of protrusion of the shift rod 59 from the shift housing 58.

The shift slider 65 extends in the front-rear direction within the lower case 24. The shift slider 65 is coaxial with the propeller shaft 17. The shift slider 65 is located partially in front of the propeller shaft 17. The shift slider 65 includes a spline 70 including teeth extending in the front-rear direction provided on the outer periphery thereof. The spline 70 is inserted in a center hole 72 of the propeller shaft 17 extending rearward from a front end portion of the propeller shaft 17. The shift slider 65 is spline-coupled to the propeller shaft 17. The shift slider 65 is movable in the front-rear direction with respect to the propeller shaft 17 and rotatable together with the propeller shaft 17.

The coupling pin 66 is inserted in a through hole 73 that penetrates the propeller shaft 17 in the radial direction of the propeller shaft 17. A rear end portion of the shift slider 65 is located within the through hole 73. The coupling pin 66 is inserted in an insertion hole 71 of the shift slider 65 within the through hole 73. Respective end portions of the coupling pin 66 are inserted in the first dog clutch 52 that surrounds the through hole 73. The coupling pin 66 is movable in the front-rear direction within the through hole 73. The coupling pin 66 is movable together with the first dog clutch 52 and the shift slider 65 in the front-rear direction with respect to the propeller shaft 17 and rotatable together with the first dog clutch 52, the shift slider 65, and the propeller shaft 17.

The link arm 60 includes a first end portion coupled to the shift rod 59 via a horizontally extending first pin 61, a second end portion coupled to the pusher 64 via a horizontally extending second pin 63, and an intermediate portion coupled to a holder 75 via a horizontally extending intermediate pin 62. The holder 75 extends downward from the spacer 74 and is fixed to the lower case 24 via the spacer 74.

The intermediate portion of the link arm 60 is rotatable about the center line of the intermediate pin 62 with respect to the holder 75. The second end portion of the link arm 60 is rotatable about the center line of the second pin 63 with respect to the pusher 64. The first pin 61, which is interposed between the first end portion of the link arm 60 and the shift rod 59, is held on the shift rod 59 in a manner movable in the front-rear direction with respect to the shift rod 59.

When the shift rod 59 moves vertically, the first end portion of the link arm 60 is pushed upward or downward to turn vertically about the center line of the intermediate pin 62. Accordingly, the second end portion of the link arm 60 turns in the front-rear direction about the center line of the intermediate pin 62 while rotating about the center line of the second pin 63 with respect to the pusher 64. This causes the pusher 64 to be pushed forward or rearward.

The pusher 64 is inserted in an annular groove 68 surrounding the shift slider 65 about the center line of the shift slider 65. The shift slider 65 includes annular front and rear opposed portions 67 and 69 defining the side surfaces of the annular groove 68. The front opposed portion 67 is located in front of the pusher 64, while the rear opposed portion 69 is located at the rear of the pusher 64. When the shift slider 65 is at any rotational angle, the front opposed portion 67 and the rear opposed portion 69 face the pusher 64. When the pusher 64 moves forward, the front opposed portion 67 is pushed forward and the shift slider 65 moves forward. In contrast, when the pusher 64 moves rearward, the rear opposed portion 69 is pushed rearward and the shift slider 65 moves rearward.

Next will be described the second powertrain including the electric motor 11.

The electric motor 11 is located in front of the drive shaft 15. The drive shaft 15 is supported rotatably in the lower case 24 via an upper bearing 47 and a lower bearing 48 located between the water pump 27 and the pinion 49. The electric motor 11 is located in front of the upper bearing 47. The electric motor 11 is located partially at a position lower than a position of the water pump 27, which is located above the lower case 24. The water pump 27 includes an impeller 45 that rotates together with the drive shaft 15 and a pump case 46 that houses the impeller 45 therein. The electric motor 11 protrudes upward from the lower case 24.

The electric motor 11 is, for example, a stepping motor. The electric motor 11 includes a rotor 81 including a magnet, a stator 82 including a coil, an output shaft 84 that rotates together with the rotor 81, and a motor housing 83 that houses the rotor 81 and the stator 82 therein. The motor housing 83 is fixed to the lower case 24. The output shaft 84 protrudes downward from the motor housing 83. The output shaft 84 extends vertically. The output shaft 84 is parallel or substantially parallel to the drive shaft 15.

The second transmission 13 includes a reduction mechanism 85 that reduces and transmits the rotation of the electric motor 11, an intermediate shaft 90 that transmits the rotation, which is reduced and transmitted by the reduction mechanism 85, to the propeller shaft 17, and a second drive gear 91 that rotates together with the intermediate shaft 90. The second transmission 13 further includes a second driven gear 92 to be driven and rotated by the second drive gear 91, an intermediate ring 93 that rotates together with the second driven gear 92, and the shift slider 65 surrounded by the second driven gear 92 and the intermediate ring 93. The shift slider 65 is shared by the second transmission 13 and the shift device 19.

The reduction mechanism 85 is, for example, a planetary gear mechanism. The reduction mechanism 85 includes a sun gear 86, multiple planetary gears 87 arranged around the sun gear 86, a ring gear 89 surrounding the sun gear 86 via the multiple planetary gears 87, and a carrier 88 holding the multiple planetary gears 87. The sun gear 86 is coupled to the output shaft 84 of the electric motor 11. The carrier 88 is coupled to the intermediate shaft 90. The ring gear 89 is fixed to the electric motor 11.

When the electric motor 11 rotates the output shaft 84, the sun gear 86 rotates together with the output shaft 84 and the rotation of the electric motor 11 is transmitted to each planetary gear 87. The planetary gears 87 rotate in the circumferential direction of the sun gear 86 between the sun gear 86 and the ring gear 89 while rotating about the center line of each planetary gear 87. At this time, the carrier 88 rotates together with the intermediate shaft 90 in the circumferential direction of the sun gear 86 at a rotation speed lower than the rotation speed of the output shaft 84. This causes the rotation of the electric motor 11 to be reduced and transmitted.

The intermediate shaft 90 is coaxial with the electric motor 11. The intermediate shaft 90 may be eccentric with respect to the electric motor 11. The intermediate shaft 90 extends downward from the carrier 88. The intermediate shaft 90 is parallel or substantially parallel to the drive shaft 15. The intermediate shaft 90 is located within a cylindrical shaft housing 76 fixed to the lower case 24. The intermediate shaft 90 is coupled to the second drive gear 91. The second drive gear 91 is supported on the shaft housing 76 via a bearing. The intermediate shaft 90 and the second drive gear 91 are rotatable with respect to the shaft housing 76.

Both of the second drive gear 91 and the second driven gear 92 are bevel gears. The second drive gear 91 is located over the shift slider 65. The second driven gear 92 is located in front of the propeller shaft 17. The second driven gear 92 is coaxial with the shift slider 65 and surrounds the shift slider 65 with spacing therebetween in the radial direction of the shift slider 65. The second driven gear 92 is separate from the shift slider 65. The second driven gear 92 is located farther rearward than the rotation axis of the second drive gear 91. The second driven gear 92 may be located farther forward than the rotation axis of the second drive gear 91.

The intermediate ring 93 is coaxial with the shift slider 65 and surrounds the shift slider 65. FIG. 3 shows an example in which the intermediate ring 93 is a member fixed to and different from the second driven gear 92. As shown in FIGS. 4 and 5, the intermediate ring 93 and the second driven gear 92 may be a single, integral member. The intermediate ring 93 is located between the second driven gear 92 and the propeller shaft 17 in the front-rear direction. The intermediate ring 93 is separate from and located forward of the propeller shaft 17. The intermediate ring 93 is supported rotatably in the lower case 24 via a bearing and an adapter 77.

The second transmission 13 includes a second clutch that switches between a connecting state in which the intermediate ring 93 rotates together with the shift slider 65 and a disconnecting state in which the connection of the intermediate ring 93 and the shift slider 65 is terminated. The second clutch includes a second dog clutch 94 movable in the front-rear direction between a connection position to engage with the intermediate ring 93 and a disconnection position separated from the intermediate ring 93. FIG. 3 shows an example in which the second dog clutch 94 and the shift slider 65 are integrated into a single member. The second dog clutch 94 may be a member fixed to and different from the shift slider 65.

As shown in FIGS. 4 and 5, the second dog clutch 94 includes multiple convex portions 96 engaging, respectively, with multiple recessed portions 95 of the intermediate ring 93. The multiple convex portions 96 are located at equal or substantially equal intervals in the circumferential direction of the second dog clutch 94. The multiple convex portions 96 protrude from the shift slider 65 outward in the radial direction of the second dog clutch 94. The multiple recessed portions 95 are recessed from the inner peripheral surface of the intermediate ring 93 outward in the radial direction of the second dog clutch 94. The multiple recessed portions 95 are located at equal or substantially equal intervals in the circumferential direction of the second dog clutch 94. The convex portions 96 and the recessed portions 95 are located between the annular groove 68 and the spline 70 in the front-rear direction.

The second dog clutch 94 is located at one of the front disconnection position (shown in FIG. 4), the connection position (shown in FIG. 3), and the rear disconnection position (shown in FIG. 5). When the second dog clutch 94 moves to the connection position, each convex portion 96 is fitted in the corresponding recessed portion 95. This causes the second clutch to be switched from the disconnecting state to the connecting state. In the connecting state, the rotation is transmitted between the intermediate ring 93 and the shift slider 65 with no slippage. In the disconnecting state, the transmission of rotation between the intermediate ring 93 and the shift slider 65 is cut off.

The shift actuator 57 locates the shift slider 65 in one of the front position (shown in FIG. 4), the intermediate position (shown in FIG. 3), and the rear position (shown in FIG. 5). In the intermediate position, the first dog clutch 52 is located at the neutral position and the second dog clutch 94 is located at the connection position. In the front position, the first dog clutch 52 is located at the forward drive position and the second dog clutch 94 is located at the front disconnection position. In the rear position, the first dog clutch 52 is located at the reverse drive position and the second dog clutch 94 is located at the rear disconnection position.

When the shift actuator 57 moves the shift slider 65 from the intermediate position to the front position, the plurality of front convex portions 54 of the first dog clutch 52 move forward toward the plurality of front recessed portions 53 of the front gear 50 while the multiple convex portions 96 of the second dog clutch 94 move forward with respect to the multiple recessed portions 95 of the intermediate ring 93. When the shift slider 65 is located at the front position, the multiple convex portions 96 of the second dog clutch 94 are separated in a forward direction from the multiple recessed portions 95 of the intermediate ring 93 and the plurality of front convex portions 54 of the first dog clutch 52 engage with the plurality of front recessed portions 53 of the front gear 50. This causes the first clutch to be connected and the second clutch to be disconnected.

Similarly, when the shift actuator 57 moves the shift slider 65 from the intermediate position to the rear position, the plurality of rear convex portions 55 of the first dog clutch 52 move rearward toward the plurality of rear recessed portions 56 of the rear gear 51 while the multiple convex portions 96 of the second dog clutch 94 move rearward with respect to the multiple recessed portions 95 of the intermediate ring 93. When the shift slider 65 is located at the rear position, the multiple convex portions 96 of the second dog clutch 94 are separated in a rearward direction from the multiple recessed portions 95 of the intermediate ring 93 and the plurality of rear convex portions 55 of the first dog clutch 52 engage with the plurality of rear recessed portions 56 of the rear gear 51. This causes the first clutch to be connected and the second clutch to be disconnected.

When the shift actuator 57 moves the shift slider 65 from the front position or the rear position to the intermediate position, the multiple convex portions 96 of the second dog clutch 94 move toward the multiple recessed portions 95 of the intermediate ring 93. At the same time, the plurality of front convex portions 54 of the first dog clutch 52 move rearward with respect to the plurality of front recessed portions 53 of the front gear 50. Alternatively, the plurality of rear convex portions 55 of the first dog clutch 52 move forward with respect to the plurality of rear recessed portions 56 of the rear gear 51. When the shift slider 65 is located at the intermediate position, the multiple convex portions 96 of the second dog clutch 94 engage with the multiple recessed portions 95 of the intermediate ring 93 and the front convex portions 54 and the rear convex portions 55 of the first clutch are separated from the front recessed portions 53 and the rear recessed portions 56 of the first clutch. This causes the second clutch to be connected and the first clutch to be disconnected.

Figure 6:
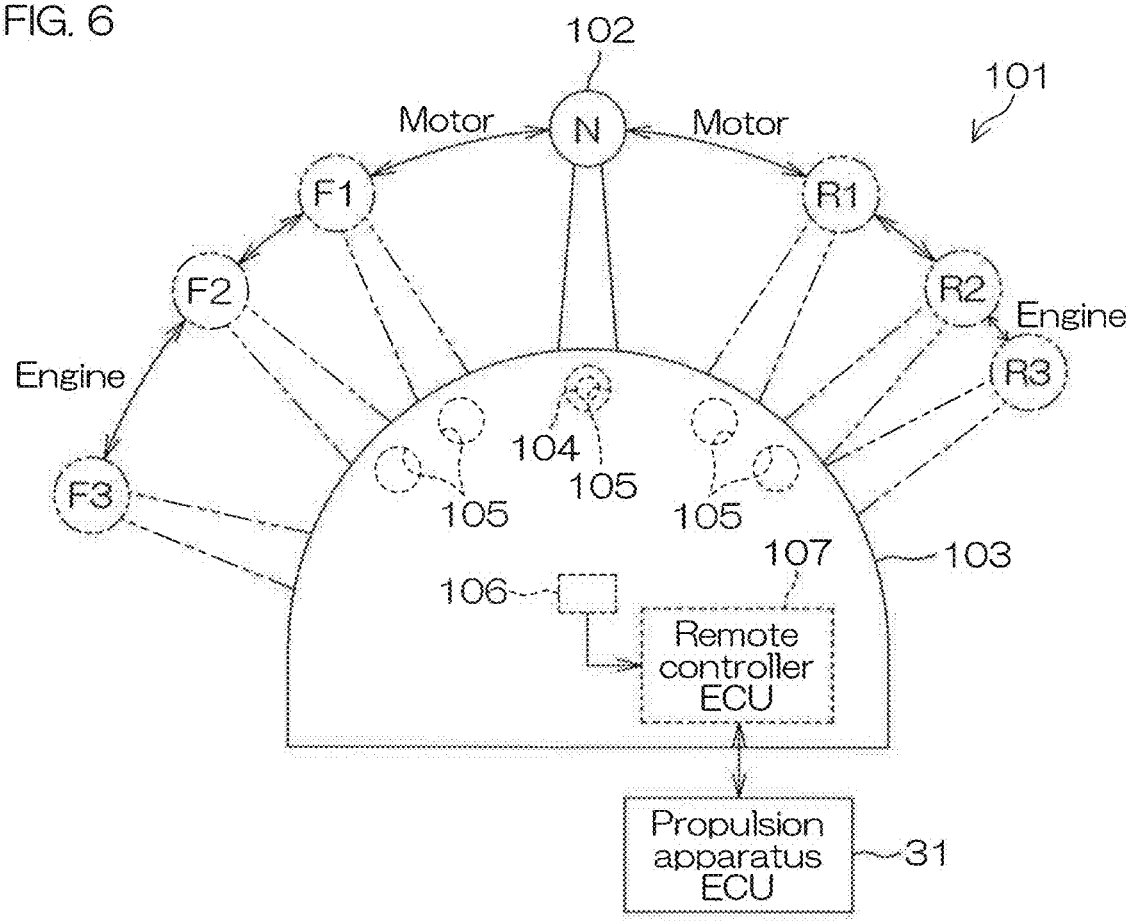
FIG. 6 is a schematic view of a remote controller.
Figure 7:
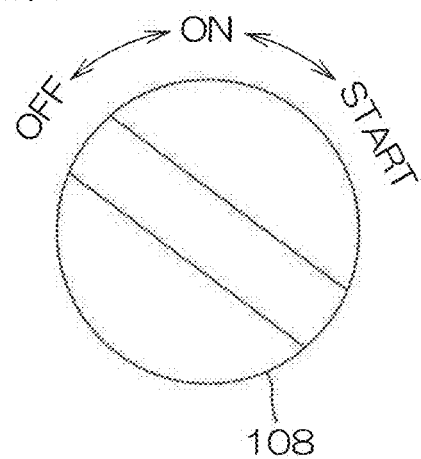
FIG. 7 is a schematic view of a starter switch.

FIG. 6 is a schematic view of a remote controller. FIG. 7 is a schematic view of a starter switch 108.

The vessel propulsion apparatus 1 includes the remote controller 101 to be operated when switching between forward drive and reverse drive of the vessel and adjusting the output of the vessel propulsion apparatus 1, and the starter switch 108 to be operated when starting the vessel propulsion apparatus 1. The remote controller 101 and the starter switch 108 are located in the hull H1 (see FIG. 2). User operations on the remote controller 101 and the starter switch 108 are transmitted electrically to the propulsion apparatus ECU 31 in a wireless or wired manner.

As shown in FIG. 6, the remote controller 101 includes a control lever 102 to be operated by a user and a remote control box 103 supporting a base end portion of the control lever 102 so that the control lever 102 is able to be tilted in the front-rear direction. The control lever 102 corresponds to a throttle member to be operated when adjusting the output of the vessel propulsion apparatus 1 and a shift member to be operated when switching between forward drive and reverse drive of the vessel. Instead of the control lever 102, the remote controller 101 may include a throttle member and a shift member that are independent of each other.

The control lever 102 is able to be tilted in the front-rear direction between a third forward drive position F3 and a third reverse drive position R3. The third forward drive position F3 is a full-throttle position at which the thrust to propel the vessel forward is a maximum. The third reverse drive position R3 is a full-throttle position at which the thrust to propel the vessel rearward is a maximum. A neutral position N is an original position at which the vessel propulsion apparatus 1 generates no thrust. The region from the neutral position N to the third forward drive position F3 is a forward drive region in which the vessel propulsion apparatus 1 propels the vessel forward. The region from the neutral position N to the third reverse drive position R3 is a reverse drive region in which the vessel propulsion apparatus 1 propels the vessel rearward.

The control lever 102 moves from the neutral position N to the third forward drive position F3 via a first forward drive position F1 and a second forward drive position F2 in this order. The region from the neutral position N to the first forward drive position F1 is an EM forward drive region in which only the electric motor 11 rotates the propeller 18 in the forward rotation direction. The region from the first forward drive position F1 to the second forward drive position F2 is a switching region in which the motor is switched between the engine 8 and the electric motor 11. The region from the second forward drive position F2 to the third forward drive position F3 is an EG forward drive region in which only the engine 8 rotates the propeller 18 in the forward rotation direction.

Similarly, the control lever 102 moves from the neutral position N to the third reverse drive position R3 via a first reverse drive position R1 and a second reverse drive position R2 in this order. The region from the neutral position N to the first reverse drive position R1 is an EM reverse drive region in which only the electric motor 11 rotates the propeller 18 in the reverse rotation direction. The region from the first reverse drive position R1 to the second reverse drive position R2 is a switching region in which the motor is switched between the engine 8 and the electric motor 11.

The region from the second reverse drive position R2 to the third reverse drive position R3 is an EG reverse drive region in which only the engine 8 rotates the propeller 18 in the reverse rotation direction.

When the user moves the control lever 102 to the neutral position N, a protrusion 104 provided on the control lever 102 fits in a recess 105 provided in the remote control box 103 and the control lever 102 is applied with an increased resistance. When the user tilts the control lever 102 forward or rearward from the neutral position N, the protrusion 104 moves out of the recess 105. This causes the user to intuitively know whether or not the control lever 102 is located at the neutral position N. Such a recess 105 is also provided at each of the first forward drive position F1, the second forward drive position F2, the first reverse drive position R1, and the second reverse drive position R2.

The remote controller 101 includes a lever position sensor 106 that detects the position of the control lever 102 and a remote controller ECU 107 configured or programmed to output to the propulsion apparatus ECU 31 a shift change signal to shift the outboard motor 3 and an output change signal to change the output of the vessel propulsion apparatus 1 according to a detection value of the lever position sensor 106. The propulsion apparatus ECU 31 switches between forward drive and reverse drive of the vessel according to the position of the control lever 102. The propulsion apparatus ECU 31 also increases the output of the electric motor 11 or the engine 8 with the increase in the amount of movement of the control lever 102 from the neutral position N.

As shown in FIG. 7, the starter switch 108 is located at one of an OFF position, an ON position, and a START position according to a user operation. FIG. 7 shows an example in which the starter switch 108 is a rotary switch. The starter switch 108 is not limited to a rotary switch, but may be a push-type or pull-type switch or a switch of a type other than these. The ON position is a position between the OFF position and the START position. The starter switch 108, once located at the START position and then left by the user, automatically returns to the ON position.

At the OFF position, an electric circuit that connects a battery and electrical equipment to each other is disconnected. At the ON position, the disconnection of the electric circuit is terminated and the battery and the electrical equipment are connected via the electric circuit. At the START position, the starter motor 35 is operated or the propulsion apparatus ECU 31 is caused to memorize that the operation of the starter motor 35 is permitted. As shown in FIG. 2, the electric motor 11 is connected to a battery B1 located within the hull H1. Similarly, the starter motor 35 is connected to a battery B2 located within the hull H1. The electric motor 11 and the starter motor 35 may be connected to the same battery.

When the control lever 102 is in the neutral position N and the user moves the starter switch 108 from the OFF position via the ON position to the START position, the electric circuit interposed between the electric motor 11 and the battery B1 is closed. Further, a start permission command to permit starting the engine 8 is input to the propulsion apparatus ECU 31 and the propulsion apparatus ECU 31 is caused to memorize that the start is permitted. This memory is maintained until the starter switch 108 is moved to the OFF position. As will be described below, the propulsion apparatus ECU 31 causes the starter motor 35 to start the engine 8 according to the position of the control lever 102.

FIG. 8 is a table showing the relationship between the position of the control lever 102 and the operation of the engine 8 and other components when the control lever 102 is tilted forward. FIG. 9 is a table showing the relationship between the position of the control lever 102 and the operation of the engine 8 and other components when the control lever 102 is tilted rearward.

In FIGS. 8 and 9, "←" indicates that the control lever 102 moves forward, while "→" indicates that the control lever 102 moves rearward. "EG" means the engine 8 and "EM" means the electric motor 11. "F," "N," and "R" of the first dog clutch 52 mean "forward drive position," "neutral position," and "reverse drive position," respectively. "ON" and "OFF" of the second dog clutch 94 mean "connection position" and "disconnection position," respectively.

First will be described the operation of the engine 8 and other components when the control lever 102 is tilted forward from the neutral position N with reference to FIG. 8.

When the control lever 102 is in the neutral position N, the first dog clutch 52 is located in the neutral position, at which it is separated from both of the front gear 50 and the rear gear 51, and the second dog clutch 94 is located in the connection position, at which the multiple convex portions 96 engage with the multiple recessed portions 95. When the user moves the control lever 102 forward from the neutral position N, the propulsion apparatus ECU 31 rotates the electric motor 11 in the forward rotation direction and the electric motor 11 generates power (torque). This causes the propeller 18 to rotate in the forward rotation direction and then thrust that propels the vessel forward is generated.

When the control lever 102 is located between the neutral position N and the first forward drive position F1, the propulsion apparatus ECU 31 increases the power of the electric motor 11 with an increase in the amount of movement of the control lever 102 from the neutral position N, or decreases the power of the electric motor 11 with a decrease in the amount of movement of the control lever 102 from the neutral position N. Accordingly, the thrust that propels the vessel forward increases or decreases.

When the control lever 102 is located between the first forward drive position F1 and the second forward drive position F2, the propulsion apparatus ECU 31 causes the starter motor 35 to start the engine 8. This causes the rotation of the engine 8 to be transmitted via the drive shaft 15 and the pinion 49 to the front gear 50 and the rear gear 51, so that the front gear 50 and the rear gear 51 rotate in mutually opposite directions. The propulsion apparatus ECU 31 then controls the opening degree of the throttle valve, for example, to keep the rotation speed of the engine 8 at low rotation speed. At this time, the rotation speed of the engine 8 may be an idling rotation speed or a trolling rotation speed.

After starting the engine 8, the propulsion apparatus ECU 31 determines whether or not the rotation speed of the front gear 50 is equal to or lower than a first threshold value (the first threshold value is a positive value) and the speed difference that indicates the absolute value of the difference between the rotation speed of the front gear 50 and the rotation speed of the first dog clutch 52 is greater than 0 and equal to or lower than a second threshold value (the second threshold value is a positive value). "0" is an example of a lower limit and the second threshold value is an example of an upper limit.

The rotation speed of the front gear 50 varies depending on the rotation speed of the engine 8. When starting the engine 8, the rotation speed of the engine 8 increases temporarily, but decreases over time. When the rotation speed of the front gear 50 is higher than the first threshold value, the propulsion apparatus ECU 31 waits until the rotation speed of the front gear 50 becomes equal to or lower than the first threshold value. Meanwhile, since the first clutch is in the disconnecting state, the rotation speed of the first dog clutch 52 varies depending on the rotation speed of the electric motor 11. When the speed difference is greater than the second threshold value, the propulsion apparatus ECU 31 increases or decreases the rotation speed of the electric motor 11 such that the speed difference decreases to a value greater than 0 and equal to or lower than the second threshold value.

Before the first dog clutch 52 engages with the front gear 50, the propulsion apparatus ECU 31 thus controls the rotation speeds of the engine 8 and the electric motor 11 such that the front gear 50 and the first dog clutch 52 have almost the same but mutually different rotation speeds. The front gear 50 and the first dog clutch 52 have different rotation speeds because the front convex portions 54 of the first dog clutch 52 might be kept opposed to the front recessed portions 53 of the front gear 50 and it may be difficult for the front convex portions 54 of the first dog clutch 52 to fit into the front recessed portions 53 of the front gear 50 if the difference in speeds is zero. Also, the front gear 50 and the first dog clutch 52 have almost the same rotation speed because noise could occur when the first dog clutch 52 engages with the front gear 50 if the speed difference was great.

The propulsion apparatus ECU 31 causes the shift actuator 57 to move the shift slider 65 from the intermediate position to the front position with the rotation speed of the front gear 50 being equal to or lower than the first threshold value and the speed difference being greater than 0 and equal to or lower than the second threshold value. This causes the second dog clutch 94 to be separated from the intermediate ring 93 and the first dog clutch 52 to engage with the front gear 50. As a result, the transmission of the rotation from the electric motor 11 to the propeller shaft 17 is cut off and the rotation of the engine 8 is transmitted via the front gear 50 and the first dog clutch 52 to the propeller shaft 17.

When the control lever 102 is located at the second forward drive position F2 or passes through the second forward drive position F2 toward the third forward drive position F3, the propulsion apparatus ECU 31 stops the electric motor 11. When the control lever 102 is located between the second forward drive position F2 and the third forward drive position F3, the propulsion apparatus ECU 31 increases the power of the engine 8 with an increase in the amount of movement of the control lever 102 from the neutral position N, while decreasing the power of the engine 8 with a decrease in the amount of movement of the control lever 102 from the neutral position N.

Next will be described the operation of the engine 8 and other components when the control lever 102 is put back from the third forward drive position F3 to the neutral position N.

After the control lever 102 is located at the third forward drive position F3 and when the user moves the control lever 102 back toward the neutral position N such that the control lever 102 is located at the second forward drive position F2 or passes through the second forward drive position F2 toward the first forward drive position F1, the propulsion apparatus ECU 31 decreases the opening degree of the throttle valve, for example, to reduce and keep the rotation speed of the engine 8 at a low rotation speed. At this time, the rotation speed of the engine 8 may be an idling rotation speed or a trolling rotation speed.

After reducing the rotation speed of the engine 8, the propulsion apparatus ECU 31 powers and rotates the electric motor 11 in the forward rotation direction. The rotation of the electric motor 11 is transmitted via the intermediate shaft 90 and the second drive gear 91 to the second driven gear 92 and the intermediate ring 93. After starting the electric motor 11, the propulsion apparatus ECU 31 determines whether or not the rotation speed of the intermediate ring 93 is equal to or lower than a third threshold value (the third threshold value is a positive value) and the speed difference that indicates the absolute value of the difference between the rotation speed of the intermediate ring 93 and the rotation speed of the second dog clutch 94 is greater than 0 and equal to or lower than a fourth threshold value (the fourth threshold value is a positive value).

The propulsion apparatus ECU 31 causes the shift actuator 57 to move the shift slider 65 from the front position to the intermediate position with the rotation speed of the intermediate ring 93 being equal to or lower than the third threshold value and the speed difference being greater than 0 and equal to or lower than the fourth threshold value. This causes the first dog clutch 52 to be separated from the front gear 50 and the second dog clutch 94 to engage with the intermediate ring 93. As a result, the transmission of the rotation from the engine 8 to the propeller shaft 17 is cut off and the rotation of the electric motor 11 is transmitted via the shift slider 65 to the propeller shaft 17.

When the control lever 102 is located at the first forward drive position F1 or passes through the first forward drive position F1 toward the neutral position N, the propulsion apparatus ECU 31 stops the engine 8. When the control lever 102 is located between the first forward drive position F1 and the neutral position N, the propulsion apparatus ECU 31 increases the power of the electric motor 11 with an increase in the amount of movement of the control lever 102 from the neutral position N, while decreasing the power of the electric motor 11 with a decrease in the amount of movement of the control lever 102 from the neutral position N. When the control lever 102 is located at the neutral position N, the propulsion apparatus ECU 31 stops the electric motor 11.

FIG. 9 shows the operation of the engine 8 and other components when the control lever 102 is tilted rearward from the neutral position N and when the control lever 102 is moved back from the third reverse drive position R3 to the neutral position N. The operation of the engine 8 and other components in FIG. 9 is similar to the operation of the engine 8 and other components in FIG. 8 except that the direction of rotation of the electric motor 11 is not the forward rotation direction but the reverse rotation direction and that the first dog clutch 52 is not located at the forward drive position but at the reverse drive position. Hence, detailed description of FIG. 9 will be omitted.

As described heretofore, in the first preferred embodiment of the present invention, the power of the engine 8 is transmitted to the propeller shaft 17 via the first transmission path 9 extending from the engine 8 to the propeller shaft 17. The power of the electric motor 11 is transmitted to the propeller shaft 17 via the second transmission path 12, which is different from the first transmission path 9, extending from the electric motor 11 to the propeller shaft 17. It is therefore possible to divert a first transmission path provided in existing vessel propulsion apparatuses including only an engine. Further, the second transmission 13, which does not transmit the power of the engine 8, is significantly improved or optimized such that the power of the electric motor 11 is transmitted efficiently.

In the present preferred embodiment, the electric motor 11 is located partially within the lower case 24 that houses the propeller shaft 17 therein. The second transmission 13 extending from the electric motor 11 to the propeller shaft 17 is also located within the lower case 24. Thus, existing vessel propulsion apparatuses are able to be modified into the hybrid type vessel propulsion apparatus 1 only by modifying the lower unit including the lower case 24 and the members held thereon. In other words, the structure in a region higher than that of the lower case 24 is at least partially similar or the same as existing vessel propulsion apparatuses. Further, the electric motor 11, which is housed in the lower case 24 to be submerged in the water, is cooled effectively via the lower case 24.

In the present preferred embodiment, the electric motor 11 is located partially at a position lower than a position of the water pump 27. The second transmission 13 extending from the electric motor 11 to the propeller shaft 17 is also located at a position lower than a position of the water pump 27. Thus, the structure in a region higher than that of the water pump 27 is at least partially similar or the same as existing vessel propulsion apparatuses. This reduces costs for the development of the hybrid type vessel propulsion apparatus 1.

In common outboard motors, the drive shaft to be driven and rotated by the engine is located in front of the exhaust channel through which exhaust gas is discharged from the engine. In the present preferred embodiment, the electric motor 11 is located farther forward than the drive shaft 15. Accordingly, the electric motor 11 is located farther forward than the exhaust channel 29. The electric motor 11 is thus provided without affecting the exhaust channel 29.

In the present preferred embodiment, the power of the shift actuator 57 is transmitted to the forward-reverse switch 16 and the direction of rotation transmitted from the engine 8 to the propeller shaft 17 is switched. The electric motor 11 is located farther rearward than the shift actuator 57. Accordingly, the electric motor 11 is closer to the propeller shaft 17, compared to the case in which the electric motor 11 is located farther forward than the shift actuator 57, so that the second transmission path 12 is shortened. This allows power loss through the second transmission path 12 to be reduced and power transmission efficiency to be increased.

Typically, the electric motor 11 is longer in the axial direction than in the radial direction. The output shaft 84 of the electric motor 11 extends in the axial direction of the electric motor 11. In the present preferred embodiment, the output shaft 84 of the electric motor 11 extends vertically and the axial direction of the electric motor 11 is parallel or substantially parallel to the vertical direction. In this case, the vessel propulsion apparatus 1 has a smaller size in the front-rear direction, compared to the case in which the output shaft 84 of the electric motor 11 extends in the front-rear direction.

In the present preferred embodiment, the first clutch is located in the first transmission path 9 and the second clutch is located in the second transmission path 12. Putting the second clutch in the disconnecting state when the engine 8 rotates the propeller shaft 17 prevents the resistance of the electric motor 11 from being transmitted to the propeller shaft 17. Further, putting the second clutch in the disconnecting state prevents a large induced electromotive force from occurring in the electric motor 11 even if the engine 8 rotates the propeller shaft 17 at high speed. In addition, switching between the connection and disconnection of the second clutch when the engine 8 rotates the propeller shaft 17 allows the electric motor 11 to function as a generator while preventing a large induced electromotive force from occurring therein.

In the present preferred embodiment, when the first clutch is switched to the disconnecting state, the second clutch is switched to the connecting state. In contrast, when the second clutch is switched to the disconnecting state, the first clutch is switched to the connecting state. It is therefore possible to prevent the resistance of the electric motor 11 from being transmitted to the propeller shaft 17 when the engine 8 rotates the propeller shaft 17. Alternatively, it is possible to prevent the resistance of the engine 8 from being transmitted to the propeller shaft 17 when the electric motor 11 rotates the propeller shaft 17. This allows the power of the engine 8 and the electric motor 11 to be utilized efficiently.

In the present preferred embodiment, when the shift actuator 57 moves the shift slider 65, the first dog clutch 52, which is an example of the first movable member, moves between the disconnection position and the connection position and the second dog clutch 94, which is an example of the second movable member, moves between the disconnection position and the connection position. This interlocks the first clutch and the second clutch. Further, since such a single shift actuator 57 moves both the first dog clutch 52 and the second dog clutch 94, the vessel propulsion apparatus 1 has a smaller size, compared to the case in which actuators are provided, respectively, for the first dog clutch 52 and the second dog clutch 94.

In the present preferred embodiment, before the first dog clutch 52 engages with the first driven gear, the propulsion apparatus ECU 31, which is an example of the controller, controls the rotation speeds of the engine 8 and the electric motor 11 such that the first driven gear and the first dog clutch 52 have almost the same but mutually different rotation speeds. The first driven gear and the first dog clutch 52 have respective different rotation speeds because it may be difficult for the first dog clutch 52 to engage with the first driven gear if the difference in speeds is zero. Thus, controlling the rotation speed of the first driven gear and the first dog clutch 52 allows the first dog clutch 52 to reliably engage with the first driven gear while preventing the generation of noise.

In the present preferred embodiment, the rotation of the electric motor 11 is transmitted to the shift slider 65 that moves together with the first dog clutch 52 in the front-rear direction. This causes the shift slider 65 to rotate together with the propeller shaft 17 and the rotation of the electric motor 11 to be transmitted to the propeller 18. Since the shift slider 65, which is included in existing vessel propulsion apparatuses and thus doubles as a component of the second transmission 13, the number of components of the vessel propulsion apparatus 1 is reduced and the vessel propulsion apparatus 1 has a smaller size.

In the present preferred embodiment, the rotation of the electric motor 11 is transmitted to the reduction mechanism 85. The reduction mechanism 85 transmits the rotation of the electric motor 11 to the propeller shaft 17 while reducing the rotation thereof. Meanwhile, the power (torque) of the electric motor 11 is amplified. It is therefore possible to increase the maximum value of the torque transmitted from the electric motor 11 to the propeller shaft 17. Alternatively, it is possible to reduce the size of the electric motor 11 while maintaining the maximum value of the torque transmitted from the electric motor 11 to the propeller shaft 17.

Second Preferred Embodiment

Next will be described a second preferred embodiment of the present invention. The second preferred embodiment is different from the first preferred embodiment mainly in that the second clutch 294 is interposed not between the shift slider 65 and an intermediate ring 293, but between the second driven gear 92 and the intermediate ring 293 and that the intermediate ring 293 is coupled not to the shift slider 65 but to the propeller shaft 17.

Figure 10:
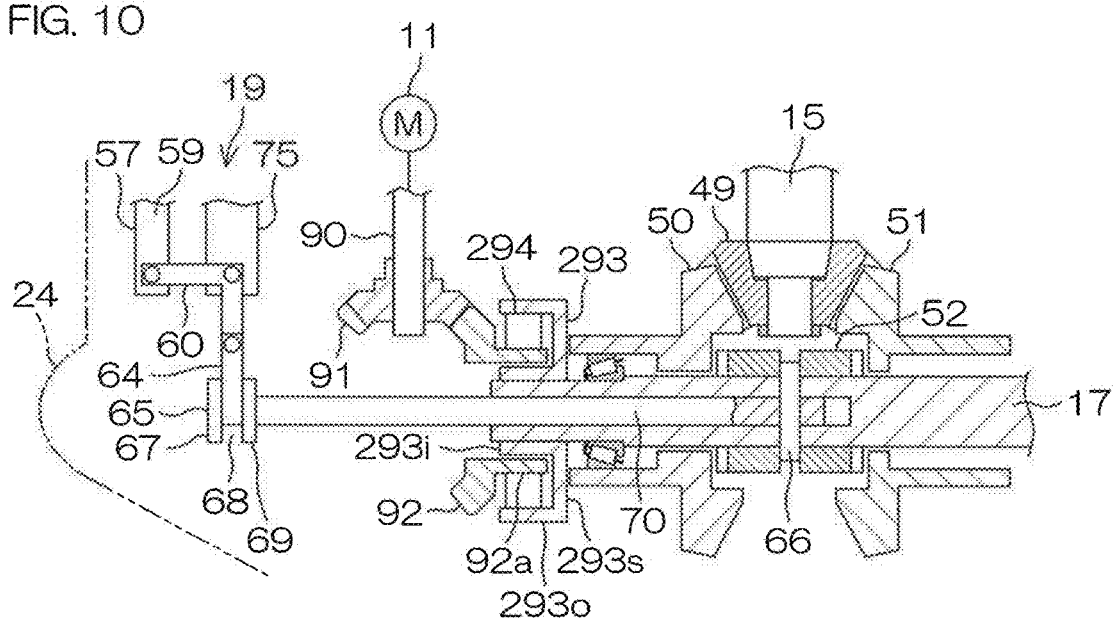
FIG. 10 is a sectional view showing a vertical section of a second clutch and its periphery according to a second preferred embodiment of the present invention.

FIG. 10 is a sectional view showing a vertical section of the second clutch 294 and its periphery according to the second preferred embodiment of the present invention. FIG. 10 shows a state in which the first dog clutch 52 is located in the neutral position. In FIG. 10, components identical to those shown in FIGS. 1 to 9 are designated by the same reference signs in FIG. 1 and other figures and the description thereof will be omitted.

The intermediate ring 293 is located in front of the front gear 50. The intermediate ring 293 includes a cylindrical inner wall 293i surrounding the propeller shaft 17, a cylindrical outer wall 293o surrounding the second clutch 294, and an annular side wall 293s extending from the inner wall 293i to the outer wall 293o. The outer wall 293o is fixed to the propeller shaft 17 through press fitting, for example. The intermediate ring 293 rotates together with the propeller shaft 17.

The intermediate ring 293 defines an annular housing groove that opens forward with the outer wall 293o, the inner wall 293i, and the side wall 293s. The second clutch 294 is located within the housing groove. A cylindrical portion 92a of the second driven gear 92 is inserted into a space between the second clutch 294 and the intermediate ring 293 to surround the inner wall 293i with a space in the radial direction of the intermediate ring 293. The cylindrical portion 92a is separated outward from the inner wall 293i and separated forward from the side wall 293s. The side wall 293s is located at the rear of the second clutch 294 and the second driven gear 92.

The second clutch 294 includes a first rotational element coupled to the cylindrical portion 92a of the second driven gear 92 and a second rotational element coupled to the outer wall 293o of the intermediate ring 293. The second clutch 294 may be a reverse input shutoff clutch, a friction clutch such as a multi-disk clutch, etc., or may be a clutch other than these. The reverse input shutoff clutch and the friction clutch switch between a connecting state and a disconnecting state independently of the first clutch including the first dog clutch 52.

The reverse input shutoff clutch transmits torque in the forward rotation direction and the reverse rotation direction from the electric motor 11 side toward the propeller shaft 17 side. On the other hand, the reverse input shutoff clutch, when input with torque from the propeller shaft 17 side, disconnects the second transmission path to run idle. The reverse input shutoff clutch is disclosed in Japanese Patent Application Publication No. 2003-056603, for example. The disclosure of this publication is incorporated herein by reference in its entirety.

In addition to the actions and effects according to the first preferred embodiment, the second preferred embodiment exhibits the following actions and effects. Specifically, in the second preferred embodiment, the second clutch 294 does not interlock with the first clutch including the first dog clutch 52 but is switched independently of the first clutch. It is therefore possible to drive the propeller 18 with both the engine 8 and the electric motor 11. It is further possible to disconnect both the first transmission path and the second transmission path.

Third Preferred Embodiment

Next will be described a third preferred embodiment of the present invention. The third preferred embodiment is different from the first preferred embodiment mainly in that the electric motor 11 is coaxial with the propeller shaft 17 and that the intermediate shaft 90, the second drive gear 91, and the second driven gear 92 are omitted.

Figure 11:
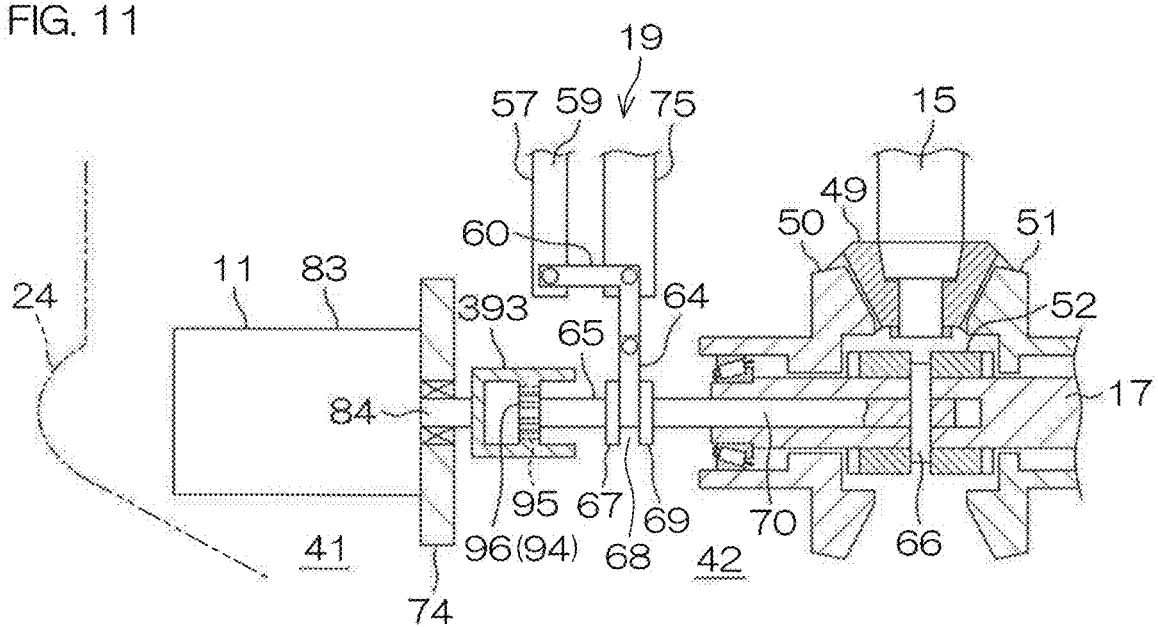
FIG. 11 is a sectional view showing a vertical section of an electric motor and its periphery according to a third preferred embodiment of the present invention.

FIG. 11 is a sectional view showing a vertical section of the electric motor 11 and its periphery according to the third preferred embodiment of the present invention. FIG. 11 shows a state in which the first dog clutch 52 is located in the neutral position and the second dog clutch 94 is located in the connection position. In FIG. 11, components identical to those shown in FIGS. 1 to 10 are designated by the same reference signs in FIG. 1 and other figures and the description thereof will be omitted.

An electric motor 11 is located in front of the propeller shaft 17 and the shift slider 65. The electric motor 11 is located farther forward than the shift actuator 57. The output shaft 84 protrudes rearward from the motor housing 83 and extends in the front-rear direction. The center line of the output shaft 84 is collinear with the center line of the propeller shaft 17. The motor chamber 41 that houses the electric motor 11 therein is located in front of the shift chamber 42 that houses the second clutch therein. The motor chamber 41 is separated from the shift chamber 42 by the spacer 74.

The intermediate ring 393 is coupled to the output shaft 84 of the electric motor 11. The intermediate ring 393 rotates together with the output shaft 84. The second dog clutch 94 is located farther forward than the annular groove 68 in which the pusher 64 of the shift device 19 is inserted. When the second dog clutch 94 is located at the connection position, the multiple convex portions 96 of the second dog clutch 94 engage with the multiple recessed portions 95 of the intermediate ring 393. At this time, when the electric motor 11 rotates the output shaft 84, the shift slider 65 and the propeller shaft 17 rotate at the same rotation speed in the same direction of rotation as the output shaft 84.

In addition to the actions and effects according to the first preferred embodiment, the third preferred embodiment exhibits the following actions and effects. Specifically, the electric motor 11 is typically longer in the axial direction than in the radial direction. The output shaft 84 of the electric motor 11 extends in the axial direction of the electric motor 11. In the present preferred embodiment, the output shaft 84 of the electric motor 11 extends in the front-rear direction and the axial direction of the electric motor 11 is parallel or substantially parallel to the front-rear direction. In this case, the vessel propulsion apparatus has a smaller vertical size, compared to the case in which the output shaft 84 of the electric motor 11 extends vertically.

In the present preferred embodiment, the output shaft 84 of the electric motor 11 not only extends in the front-rear direction but also is coaxial with the propeller shaft 17. It is therefore possible to shorten the second transmission path, compared to the case in which the output shaft 84 of the electric motor 11 is not coaxial with the propeller shaft 17. This allows power loss through the second transmission path to be reduced and power transmission efficiency from the electric motor 11 to the propeller shaft 17 to be increased.

Fourth Preferred Embodiment

Figure 12:
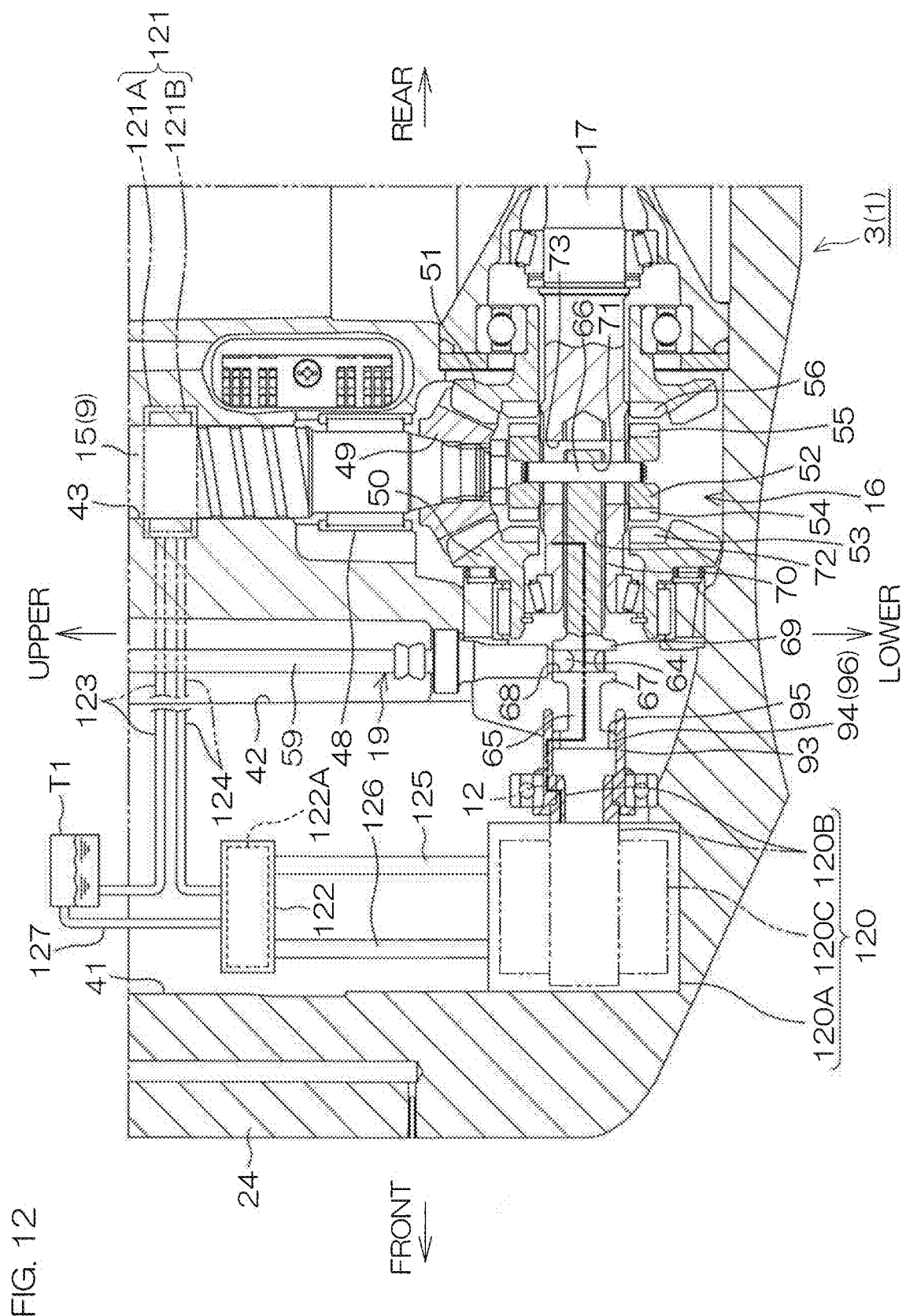
FIG. 12 is a sectional view showing a portion of a vertical section of a lower unit of an outboard motor of a vessel propulsion apparatus according to a fourth preferred embodiment of the present invention.

Next will be described a fourth preferred embodiment of the present invention. The fourth preferred embodiment is different from the first preferred embodiment mainly in that a hydraulic motor 120 is provided, instead of the electric motor 11. In FIGS. 12 and 13 described below, components identical to those shown in FIGS. 1 to 11 are designated by the same reference signs in FIG. 1 and other figures and the description thereof will be omitted.

FIG. 12 is a sectional view showing a portion of a vertical section of the lower unit of the outboard motor 3 of the vessel propulsion apparatus 1 according to the fourth preferred embodiment of the present invention. FIG. 12 shows a state in which the first dog clutch 52 is located in the neutral position and the second dog clutch 94 is located in the connection position.

As shown in FIG. 12, the second powertrain of the vessel propulsion apparatus 1 includes, instead of the electric motor 11, the hydraulic motor 120. The vessel propulsion apparatus 1 includes an oil tank T1 that stores hydraulic oil, a hydraulic pump 121 that sucks in the hydraulic oil from the oil tank T1 and supplies the hydraulic motor 120 with the hydraulic oil, and a hydraulic pressure controller 122 that controls the rotation of the hydraulic motor 120 by controlling the hydraulic oil to be supplied to the hydraulic motor 120 from the hydraulic pump 121.

FIG. 12 shows an example in which the entire hydraulic motor 120 is disposed in the motor chamber 41 provided in the lower case 24. In a case in which the hydraulic motor 120 is connected to the intermediate ring 93 via a transmission gear such as the second drive gear 91 and the second driven gear 92 shown in FIG. 3, a portion of or the entire hydraulic motor 120 may be disposed outside the lower case 24. The oil tank T1 may be disposed inside the lower case 24, or may be disposed outside the lower case 24. The same applies to the hydraulic pump 121 and the hydraulic pressure controller 122.

The hydraulic motor 120 is preferably a rotary motor that converts hydraulic pressure to rotation. The hydraulic motor 120 includes a rotor 120C that rotates due to the supply of the hydraulic pressure, an output shaft 120B that rotates together with the rotor 120C, and a casing 120A that houses the rotor 120C. In a case in which there is a motion converter that converts linear motion to rotation, the hydraulic motor 120 may be a piston motor that converts hydraulic pressure to linear motion. The hydraulic motor 120 generates an initial torque promptly as compared with the electric motor 11. Thus, the hydraulic motor 120 is more responsive than the electric motor 11.

FIG. 12 shows an example in which the hydraulic motor 120 is disposed in front of the propeller shaft 17, and the output shaft 120B of the hydraulic motor 120 is coaxial with the propeller shaft 17. The hydraulic motor 120 is held in a horizontal posture in which the output shaft 120B of the hydraulic motor 120 extends rearward. As with the electric motor 11 shown in FIG. 3, the hydraulic motor 120 may be held in a vertical posture in which the output shaft 120B of the hydraulic motor 120 extends downward.

In the example shown in FIG. 12, the casing 120A of the hydraulic motor 120 is disposed in front of the intermediate ring 93. The output shaft 120B of the hydraulic motor 120 protrudes rearward from the casing 120A of the hydraulic motor 120. The output shaft 120B of the hydraulic motor 120 is coaxial with the intermediate ring 93 and the propeller shaft 17, and rotates together with the intermediate ring 93. The output shaft 120B of the hydraulic motor 120 may be integral and unitary with the intermediate ring 93. The intermediate ring 93 and the shift slider 65 define the second transmission path 12 extending from the hydraulic motor 120 to the propeller shaft 17 and not via the first transmission path 9.

The hydraulic pump 121 is coaxial with the drive shaft 15. The hydraulic pump 121 is disposed farther rearward than the hydraulic motor 12. The hydraulic pump 121 is disposed above the hydraulic motor 120. The hydraulic pump 121 is disposed above the pinion 49. FIG. 12 shows an example in which the hydraulic pump 121 is disposed below the water pump 27 (refer to FIG. 3). The hydraulic pump 121 may be disposed above the water pump 27.

The hydraulic pump 121 includes an impeller 121B that is driven and rotated by the engine 8 and a casing 121A that houses the impeller 121B. The impeller 121B is attached to the drive shaft 15. The impeller 121B rotates together with the drive shaft 15. When the engine 8 is operating, that is, when the crankshaft 14 (refer to FIG. 1) is rotating, the impeller 121B rotates at the same speed and in the same direction as the drive shaft 15. Thus, a force that sucks the hydraulic oil into the casing 121A and discharges the hydraulic oil into the casing 121A is generated.

The oil tank T1 is connected to the casing 121A of the hydraulic pump 121 via a suction pipe 123. The hydraulic pressure controller is connected to the casing 121A of the hydraulic pump 121 via a discharge pipe 124. The hydraulic pressure controller 122 is connected to the oil tank T1 via a return pipe 127. The hydraulic oil in the oil tank T1 is sucked into the hydraulic pump 121 via the suction pipe 123. The hydraulic oil that has been discharged from the hydraulic pump 121 is supplied to the hydraulic pressure controller 122 via the discharge pipe 124.

The hydraulic pressure controller 122 is connected to the hydraulic motor 120 via a first pipe 125 and is connected to the hydraulic motor 120 via a second pipe 126. The hydraulic oil that has been supplied to the hydraulic pressure controller 122 is supplied to the hydraulic motor 120 via one of the first pipe 125 and the second pipe 126, and is discharged from the hydraulic motor 120 to the hydraulic pressure controller 122 via the other of the first pipe 125 and the second pipe 126. Thus, the hydraulic motor 120 rotates. The hydraulic oil that has been discharged to the hydraulic pressure controller 122 returns to the oil tank T1 via the return pipe 127, and is supplied again to the hydraulic pump 121.

The hydraulic pressure controller 122 includes a directional control valve 122A that changes a flow direction of the hydraulic oil. The directional control valve 122A includes a body that defines a flow channel, a valve element that is disposed in the flow channel, and an electromagnetic actuator that moves the valve element within the flow channel. The propulsion apparatus ECU 31 (refer to FIG. 2) changes the state of the directional control valve 122A by controlling the electromagnetic actuator. The hydraulic pressure controller 122 may further include a flow rate control valve that increases or decreases the rotation speed of the hydraulic motor 120 by changing the flow rate of the hydraulic oil to be supplied to the hydraulic motor 120 from the hydraulic pressure controller 122.

The directional control valve 122A of the hydraulic pressure controller 122 switches to any of a normal rotation state, a stopped state, and a reverse rotation state. The normal rotation state is a state in which the hydraulic oil is supplied to the hydraulic motor 120 from the hydraulic pressure controller 122 so that the hydraulic motor 120 rotates in a normal rotation direction. The reverse rotation state is a state in which the hydraulic oil is supplied to the hydraulic motor 120 from the hydraulic pressure controller 122 so that the hydraulic motor 120 rotates in a reverse rotation direction. The stopped state is a state in which the supply of the hydraulic oil from the hydraulic pressure controller 122 to the hydraulic motor 120 is stopped. When the directional control valve 122A is in the normal rotation state, the hydraulic oil is supplied to the hydraulic motor 120 from the first pipe 125 and returns to the second pipe 126 from the hydraulic motor 120. When the directional control valve 122A is in the reverse rotation state, the hydraulic oil is supplied to the hydraulic motor 120 from the second pipe 126 and returns to the first pipe 125 from the hydraulic motor 120.

In a case in which the second clutch is in the connecting state, that is, in a case in which the second dog clutch 94 is located at the connection position in which the second dog clutch 94 engages with the intermediate ring 93, when the hydraulic motor 120 rotates in the normal rotation direction, the rotation of the hydraulic motor 120 is transmitted to the propeller shaft 17, and the propeller shaft 17 rotates in the normal rotation direction. In a case in which the second clutch is in the connecting state, when the hydraulic motor 120 rotates in the reverse rotation direction, the rotation of the hydraulic motor 120 is transmitted to the propeller shaft 17, and the propeller shaft 17 rotates in the reverse rotation direction. Thus, the rotation of the hydraulic motor 120 is transmitted to the propeller shaft 17 not via the first transmission path 9, and the propeller 18 rotates in the normal rotation direction or the reverse rotation direction.

FIG. 13 is a table showing the relationship between the position of the control lever 102 (refer to FIG. 6) and the operation of the engine 8 and other components when the control lever is tilted forward.

In FIG. 13, "←" indicates that the control lever 102 moves forward, while "→" indicates that the control lever 102 moves rearward. "EG" refers to the engine 8 and "HM" refers to the hydraulic motor 120. "F," "N," and "R" of the first dog clutch 52 refer to "forward drive position," "neutral position," and "reverse drive position," respectively. "ON" and "OFF" of the second dog clutch 94 refer to "connection position" and "disconnection position," respectively.

In the example shown in FIG. 8, the propulsion apparatus ECU 31 causes the starter motor 35 (refer to FIG. 2) to start the engine 8 according to the position of the control lever 102. In the example shown in FIG. 13, when the control lever 102 is in the neutral position N and the user moves the starter switch 108 (refer to FIG. 2) to the START position, the start permission command to permit starting the engine 8 is input to the propulsion apparatus ECU 31 and the propulsion apparatus ECU 31 causes the starter motor 35 to start the engine 8. Thus, as shown in FIG. 13, when the control lever 102 is in the neutral position N, the engine 8 rotates at an idling speed.

As shown in FIG. 13, when the control lever 102 is in the neutral position N, the first dog clutch 52 is in the neutral position and the second dog clutch 94 is in the connection position. When the user moves the control lever 102 toward the first forward drive position F1 from the neutral position N, the propulsion apparatus ECU 31 switches the directional control valve 122A of the hydraulic pressure controller 122 from the stopped state to the normal rotation state. Thus, the hydraulic motor 120 starts to rotate in the normal rotation direction, and the rotation of the hydraulic motor 120 is transmitted to the propeller shaft 17.

As the amount of movement of the control lever 102 toward the first forward drive position F1 increases, the rotation speed of the engine 8 increases, and the rotation speed of the hydraulic motor 120 also increases. As the amount of movement of the control lever 102 toward the first forward drive position F1 decreases, the rotation speed of the engine 8 decreases, and the rotation speed of the hydraulic motor 120 also decreases. Thus, when the control lever 102 is located between the neutral position N and the first forward drive position F1, the thrust to propel the vessel forward increases or decreases in accordance with the amount of movement of the control lever 102.

When the user moves the control lever 102 toward the second forward drive position F2 from the first forward drive position F1, the propulsion apparatus ECU 31 moves the first dog clutch 52 from the neutral position to the forward drive position, and moves the second dog clutch 94 from the connection position to the disconnection position. As a result, the transmission of the rotation from the hydraulic motor 120 to the propeller shaft 17 is cut off and the rotation of the engine 8 is transmitted via the front gear 50 and the first dog clutch 52 to the propeller shaft 17.

When the user moves the control lever 102 toward the first forward drive position F1 from the second forward drive position F, the propulsion apparatus ECU 31 moves the first dog clutch 52 from the forward drive position to the neutral position, and moves the second dog clutch 94 from the disconnection position to the connection position. Thus, the first transmission path 9 is disconnected and the second transmission path 12 is connected. As a result, instead of the rotation of the engine 8, the rotation of the hydraulic motor 120 is transmitted to the propeller shaft 17.

The propulsion apparatus ECU 31 may switch the directional control valve 122A of the hydraulic pressure controller 122 from the normal rotation state to the stopped state so as to stop the rotation of the hydraulic motor 120 after the second dog clutch 94 moves from the connection position to the disconnection position. In this case, the propulsion apparatus ECU 31 switches the directional control valve 122A from the stopped state to the normal rotation state before the second dog clutch 94 moves from the disconnection position to the connection position.

The operation of the engine 8 and other components when the control lever 102 is in a range from the second forward drive position F2 to the third forward drive position F3 is similar to the example shown in FIG. 8. Thus, the description thereof will be omitted. It is noted that a flow rate control valve that changes the rotation speed of the hydraulic motor 120 may be provided with the hydraulic pressure controller 122 in a case of controlling the difference between the rotation speed of the front gear 50 and the rotation speed of the first dog clutch 52 when the first dog clutch 52 moves to the forward drive position and the second dog clutch 94 moves to the disconnection position ("Synchronous" shown in FIG. 13), as with the example shown in FIG. 8.

The operation of the engine 8 and other components when the control lever is tilted rearward and when the control lever 102 is put back from the third forward drive position F3 to the neutral position N is similar to the operation of the engine 8 and other components in FIG. 13 except that the direction of rotation of the hydraulic motor 120 is not the normal rotation direction but the reverse rotation direction and that the first dog clutch 52 is not located at the forward drive position but at the reverse drive position. Hence, description of the operation of the engine 8 and other components when the control lever 102 is in a range from the neutral position N to the third reverse drive position R3 will be omitted.

Other Preferred Embodiments

The present invention is not restricted to the contents of the preferred embodiments described above and various modifications are possible.

For example, the entire electric motor 11 may be located outside of the lower case 24. Specifically, the upper case 23 may house the entire electric motor 11 therein. In this case, the electric motor 11 may be located at least partially at a position higher than that of the water pump 27.

The electric motor 11 may be located at least partially farther rearward than the drive shaft 15.

In the third preferred embodiment, the electric motor 11 may not be coaxial with the propeller shaft 17 as long as the output shaft 84 extends in the front-rear direction. In this case, it is only required to interpose multiple gears between the output shaft 84 and the intermediate ring 393 to make the electric motor 11 eccentric with respect to the intermediate ring 393.

The shift device 19 may be a mechanical type (hydraulic type or cable type) in which the shift actuator 57 is not included.

The vessel propulsion apparatus 1 may include an inboard/outboard motor instead of the outboard motor 3.

The second clutch may be omitted.

Features of two or more of the various preferred embodiments described above may be combined.

The present application claims priority to Japanese Patent Application No. 2016-113793 filed on Jun. 7, 2016 in the Japan Patent Office, and the entire disclosure of which is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel propulsion apparatus comprising:
an engine;
a motor located farther forward than a propeller;
a propeller shaft that rotates together with the propeller about a rotation axis extending in a front-rear direction of the vessel propulsion apparatus;
a first transmission that defines a first transmission path extending from the engine to the propeller shaft to transmit power of the engine to the propeller shaft along the first transmission path; and
a second transmission that defines a second transmission path, different from the first transmission path, extending from the motor to the propeller shaft to transmit power of the motor to the propeller shaft along the second transmission path; wherein
from the engine to the propeller shaft and from the motor to the propeller shaft, respectively, the first transmission path is separated from the second transmission path by a distance; and
the second transmission path extends in a vertical direction or in a direction that is parallel to the first transmission path.

2. The vessel propulsion apparatus according to claim 1, further comprising a lower case that houses the propeller shaft therein; wherein
the motor is located at least partially within the lower case.

3. A vessel propulsion apparatus comprising:
an engine;
a motor located farther forward than a propeller;
a propeller shaft that rotates together with the propeller about a rotation axis extending in a front-rear direction of the vessel propulsion apparatus;
a first transmission that defines a first transmission path extending from the engine to the propeller shaft to transmit power of the engine to the propeller shaft along the first transmission path;
a second transmission that defines a second transmission path, different from the first transmission path, extending from the motor to the propeller shaft to transmit power of the motor to the propeller shaft along the second transmission path; and
a water pump that pumps water outside the vessel propulsion apparatus into the vessel propulsion apparatus; wherein
the motor is located at least partially at a position lower than a position of the water pump.

4. The vessel propulsion apparatus according to claim 1, further comprising a lower case that houses the propeller shaft therein; wherein
the first transmission includes a drive shaft in the lower case; and
the motor is located farther forward than the drive shaft.

5. A vessel propulsion apparatus comprising:
an engine;
a motor located farther forward than a propeller;
a propeller shaft that rotates together with the propeller about a rotation axis extending in a front-rear direction of the vessel propulsion apparatus;
a first transmission that defines a first transmission path extending from the engine to the propeller shaft to transmit power of the engine to the propeller shaft along the first transmission path; and
a second transmission that defines a second transmission path, different from the first transmission path, extending from the motor to the propeller shaft to transmit power of the motor to the propeller shaft along the second transmission path; wherein
the first transmission includes a forward-reverse switch that switches a direction of rotation transmitted to the propeller shaft according to power transmitted from a shift actuator; and
the motor is located farther rearward than the shift actuator.

6. The vessel propulsion apparatus according to claim 1, wherein the motor includes an output shaft extending in the vertical direction.

7. The vessel propulsion apparatus according to claim 1, wherein the motor includes an output shaft extending in the front-rear direction.

8. The vessel propulsion apparatus according to claim 7, wherein the output shaft is coaxial with the propeller shaft.

9. The vessel propulsion apparatus according to claim 1, wherein
the first transmission includes a first clutch that switches between a disconnecting state in which the first transmission path is disconnected and a connecting state in which the first transmission path is connected; and
the second transmission includes a second clutch that switches between a disconnecting state in which the second transmission path is disconnected and a connecting state in which the second transmission path is connected.

10. The vessel propulsion apparatus according to claim 9, further comprising an interlocking device that interlocks the first clutch and the second clutch.

11. The vessel propulsion apparatus according to claim 10, wherein the interlocking device switches the second clutch from the disconnecting state to the connecting state while switching the first clutch from the connecting state to the disconnecting state, and the interlocking device switches the first clutch from the disconnecting state to the connecting state while switching the second clutch from the connecting state to the disconnecting state.

12. The vessel propulsion apparatus according to claim 10, wherein
- the first clutch includes a first movable member that moves between a disconnection position in which the first transmission path is disconnected and a connection position in which the first transmission path is connected;
- the second clutch includes a second movable member that moves between a disconnection position in which the second transmission path is disconnected and a connection position in which the second transmission path is connected; and
- the interlocking device includes a shift slider that moves together with the first movable member and the second movable member and a shift actuator that generates power to move the shift slider.

13. The vessel propulsion apparatus according to claim 1, wherein
- the first transmission includes a first drive gear that rotates according to a rotation of the engine, a first driven gear that is driven and rotated by the first drive gear, and a first dog clutch that rotates together with the propeller shaft about the rotation axis and moves between a connection position to rotate together with the first driven gear and a disconnection position separated from the first driven gear;
- the vessel propulsion apparatus further comprises a shift actuator that moves the first dog clutch between the connection position and the disconnection position and a controller configured or programmed to cause the shift actuator to move the first dog clutch between the connection position and the disconnection position when a difference between a rotation speed of the first driven gear and a rotation speed of the first dog clutch is greater than a lower limit and equal to or lower than an upper limit.

14. The vessel propulsion apparatus according to claim 1, wherein
- the first transmission includes a first drive gear that rotates according to a rotation of the engine, a first driven gear that is driven and rotated by the first drive gear, and a first dog clutch that rotates together with the propeller shaft about the rotation axis and moves between a connection position to rotate together with the first driven gear and a disconnection position separated from the first driven gear; and
- the second transmission includes a shift slider that rotates together with the propeller shaft about the rotation axis and moves together with the first dog clutch in the front-rear direction with respect to the propeller shaft.

15. The vessel propulsion apparatus according to claim 1, wherein the second transmission includes a reduction mechanism that transmits and amplifies the power of the motor to the propeller shaft.

16. The vessel propulsion apparatus according to claim 1, wherein the motor is an electric motor or a hydraulic motor.

17. The vessel propulsion apparatus according to claim 16, wherein the motor is the hydraulic motor, and the vessel propulsion apparatus further comprises a hydraulic pump that is driven by the engine to supply oil to the hydraulic motor.

18. The vessel propulsion apparatus according to claim 17, wherein at least a portion of the hydraulic motor is located at a position lower than the hydraulic pump.

19. The vessel propulsion apparatus according to claim 17, wherein the first transmission includes a drive shaft coaxial with the hydraulic pump.

20. The vessel propulsion apparatus according to claim 16, wherein the motor is the hydraulic motor, and the hydraulic motor is coaxial with the propeller shaft.

* * * * *